US 6,608,636 B1

(12) United States Patent
Roseman

(10) Patent No.: US 6,608,636 B1
(45) Date of Patent: Aug. 19, 2003

(54) SERVER BASED VIRTUAL CONFERENCING

(75) Inventor: Robert D. Roseman, Kettering, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 07/883,623

(22) Filed: May 13, 1992

(51) Int. Cl.[7] ............................................. G06F 15/16
(52) U.S. Cl. ...................................................... 345/753
(58) Field of Search ............................................. 379/53

(56) References Cited

U.S. PATENT DOCUMENTS

| | | | | | |
|---|---|---|---|---|---|
| 4,400,724 | A | * | 8/1983 | Fields | 358/85 |
| 4,650,929 | A | * | 3/1987 | Boerger et al. | 358/86 |
| 4,893,326 | A | * | 1/1990 | Duran et al. | 379/53 |
| 4,965,819 | A | * | 10/1990 | Kannes | 379/53 |
| 4,995,071 | A | * | 2/1991 | Weber et al. | 379/53 |
| 5,099,510 | A | * | 3/1992 | Blinken, Jr. et al. | 379/202 |
| 5,208,912 | A | * | 5/1993 | Nakayama et al. | 395/200 |
| 5,220,657 | A | * | 6/1993 | Bly et al. | 395/425 |
| 5,315,633 | A | * | 5/1994 | Champa | 348/16 |
| 5,363,507 | A | * | 11/1994 | Nakayama et al. | 395/800 |
| 5,611,038 | A | * | 3/1997 | Shaw et al. | 395/806 |

OTHER PUBLICATIONS

NEC Research and Development—"Multimedia Desktop Conferencing System:MERMAID" by Watabe, Sakata, Maeno, Fukuoka & Ohmori—vol. 32 No. 1 pp 158–167 Jan. 1991.
I.E.E.E. 1991—"Teams for Tomorrow" by Robert Johansen pp 521–534.
Management Review—"Computer Conferencing: Brainstormingg Across Time and Space" by Marlene Piturro Aug. 1989 pp 43–50.
Presentation Products Magazine—"The Electronic Meeting" by Robert Moskowitz Sep. 1990 pp 24–32.
Gesellschaft Für Mathematik und Datenverarbeitung MBH—"The Object Oriented Approach in CSCW" No. 498 pp 1–60 Jan. 1991 Igor T. Hawryszkiewycz.
Interacting with Computer vol. 3 No. 3 (1991) "A Survey of CSCW Systems" by Tom Rodden pp 319–353.
ShareVision Technology Inc., 1992; Preliminary Information from ShareVision Technology "The Need to Bring People Together".
IBM Corporation 1991; Ultimedia Multimedia Solutions From IBM; Person to Person; "Personal Conferencing Communications That Work"; 10–91.
SMART Technologies Inc.; "SMART 2000 Conferencing System for Multimedia Interactive Meetings"; 11/92.
Fujitsu Networks Industry, Inc.; Product Description; Desktop Conferencing "Novell Local Area Networks"; 2/93.
Fujitsu Networks Industry, Inc.; Desk Top Conferencing for Windows; "Real Life. Real Time. Real Power"; BR–001.
Northern Telecom; VISIT Video; "VISIT Video Product Highlights".

(List continued on next page.)

Primary Examiner—Christopher B. Shin
(74) Attorney, Agent, or Firm—Gregory A. Welte

(57) ABSTRACT

The invention concerns remote conferencing systems of the multi-media type. An example of a "single-medium" conference system can be found in presently available telephone conferencing systems. The single medium is sound, or voice. In the conference, multiple parties, at different locations, are linked together by the telephone system and can speak to each other.

With "multi-media" conferencing, multiple parties are linked by both video and audio media: the parties can see, as well as hear, each other. Further, the invention shows the parties a common display, which functions as a "conference table." Still further, any party can modify the display, by "writing" on it, or by pointing to different parts of it; the other parties can see the modifications. Further still, the invention allows parties to "whisper" to each other, without the knowledge of other parties, as in an actual conference.

8 Claims, 22 Drawing Sheets

OTHER PUBLICATIONS

ES•F2F; The Window of Opportunity, "Videoconferencing On Any Wire", April Streeter.

Business Week/Jun. 11, 1990; Information Processing "At These Shouting Matches, No One Says A Word", Jim Bartimo; p. 78.

The New York Times; Sun., Jun. 23, 1991; Technology; "Plugging The Gap Between E–Mail And Video Conferencing", Edmund Andrews; pp. 8–9.

Elsevier Science Publishers B.V., 1988; Application of Distributed Systems "Distributed Computer Conferencing", Jacob Palme (Computer Networks and ISDN Systems 14) 1987; pp. 137–145.

Patricia Seybold's Office Computing Group, 1988; vol. 11, No. 9; Technology That Supports Meetings "We Can't Go On Meeting Like This!"; 9/88.

American Management Assoc.; Information Management FORUM; "Group Support Systems And Electronic Collaboration", Bye Wynne; 5/91.

American Management Assoc.; Information Management FORUM; "Groupware And Your Future", Bye Wynne; 11/89.

Campus News, MMR•Summer 1990; "Texaco Contributes to Group Decision Support Services Project"; p. 23.

THINK; No. 1/1990; "How To Have An "Electronic" Brainstrom" Mason Southworth; pp. 12–13.

Technology; "Software Catches The Team Spirit", Louis Richman; Reprinted from FORTUNE, 1987 TIME Inc.

Info World, vol. 11, Issue 5; Resolution Evolution; Management, "Workgroup Idea Still Unclear To Users", Alice LaPlante; Dec. 11, 1989.

"Meeting Support—An Emerging Market"; p. 69.

Creative Classroom Corp, 1991; ENTENTE' Turnkey Electronic Classroom; "It's Hard To Get Lost In This Classroom".

3M Meeting Management Institute; Meeting Management News, vol. 3, No. 1; "The Year 2000: Expect Meetings To Change, Not Decline"; 4/91.

Info World; vol. 11, Issue 49; Case Tools; Workgroup Computing; IBM Study: PCs Aid In Decision Process; pp. 1, 8.

Raymond Panko, Patterns of Organizational Communication; pp. 1–3; Tables: Use of Study Time; pp. 1–4.

The New York Times, Sun. Mar. 24, 1991; "Brainstorming By Modem".

Hitachi Review, vol. 40 (1991), No. 3; "Broadband ISDN Multimedia Workstations And Group Tele–Working Systems", T. Hoshi, F. Nakamura, and S. Nakamura; pp. 217–222.

3M Meeting Management Institute; "Meeting Management Bibliography"; Mar. 7, 1991.

The University of Arizona, Dept. of Management Information Systems; "Bibliography Group Decision Support Systems".

3M Meeting Management Institute; Meeting Management News, vol. 3, No. 3; "Study Focuses On Use Of Rules In Meetings"; 12/91.

ShareVision Technology Inc.; Feb. 1993; "Create A Meeting of the Minds".

* cited by examiner

CONFERENCE ROOM

ICON FOR PARTICIPANT

POINTER FOR PARTICIPANT

PENCIL ICON FOR WRITING

NOTEPAD ICON

CONFERENCE ROOM DOORS

SERVER BASED VIRTUAL CONFERENCING

The invention concerns conferencing systems in which several people at different locations can communicate with each other.

BACKGROUND OF THE INVENTION

Systems are presently available wherein a person can both see and speak with another at a distance. The well-known AT & T® Picturephone® is an example: it combines the telephone with television.

There also exist systems which allows computers to provide a feature known as "screen sharing." With screen sharing, one person, at a remote location, can control a second person's computer. For example, the remote person can manipulate a pointing device which moves a cursor on the screen of the second person's computer. To an extent, the two people share a common screen.

The invention carries these concepts further. The invention allows multiple persons, at different locations, to hold a conference, by providing many of the conveniences which the participants would have if present together in the same physical room.

OBJECTS OF THE INVENTION

It is an object of the invention to provide a virtual conferencing system.

It is a further object of the invention to provide a virtual conferencing system which allows multiple persons to view, and also manipulate, a common video display, which is simultaneously displayed at their different locations.

SUMMARY OF THE INVENTION

An example will illustrate one form of the invention. Two (or more) parties each operate their own local computers. The computers have associated video cameras, speaker-type telephones, and pointing devices (such as "mouses"). When a conference is established, the local computers become connected to a host computer, via commercially available Local Area Networks (LANs) and Wide Area Networks (WANs).

The parties send the information which they want displayed, such as drawings, to the host computer. The host computer generates a common video screen, which it distributes to the parties: they see the drawings at their own local computers. Each party can move a pointer on the display, and point to features on the drawings. The telephones and video cameras allow the parties to see and speak with each other.

The host controls many of the events occurring during the conference, as well as those occurring both during initiation of the conference and after termination of the proceedings.

For example, the host provides a system which allows a person to invite participants to the conference in a convenient manner, including some automated invitation features which will be described later.

As another example, the host provides some unique stenographic and recording features.

As yet another example, the host can maintain the virtual conference room in existence after the conference terminates, so that the records of the proceedings remain available for persons who wish to examine them.

DETAILED DESCRIPTION OF THE INVENTION

Overview

In the invention, the participants share a common virtual conference table. Each participant can (1) place a document onto the table electronically, (2) write on the document, draw on it, and otherwise manipulate it, and (3) move a pointer to different positions on the document, to point to specific parts of it.

All other participants see the the preceding three events as they occur.

The invention further provides the following features:

The participants can privately whisper or pass notes to each other, without the knowledge of the others.

A person wishing to invite participants to a conference can "walk a hallway" shown on that person's computer display. Doors shown in the hallway are virtual doors, through which the person can look into offices of invitees, via a video camera system.

The invitation. process itself can be viewed as a conference between two parties, namely, the inviting person and the person (or office generally) behind the door with which the inviting person is communicating at that time.

Hardware Requirements

Every office is equipped with the following equipment:

a computer (termed a "local computer" herein), one or two video cameras, and a telephone having "speaker-phone" capability.

Figure 1:
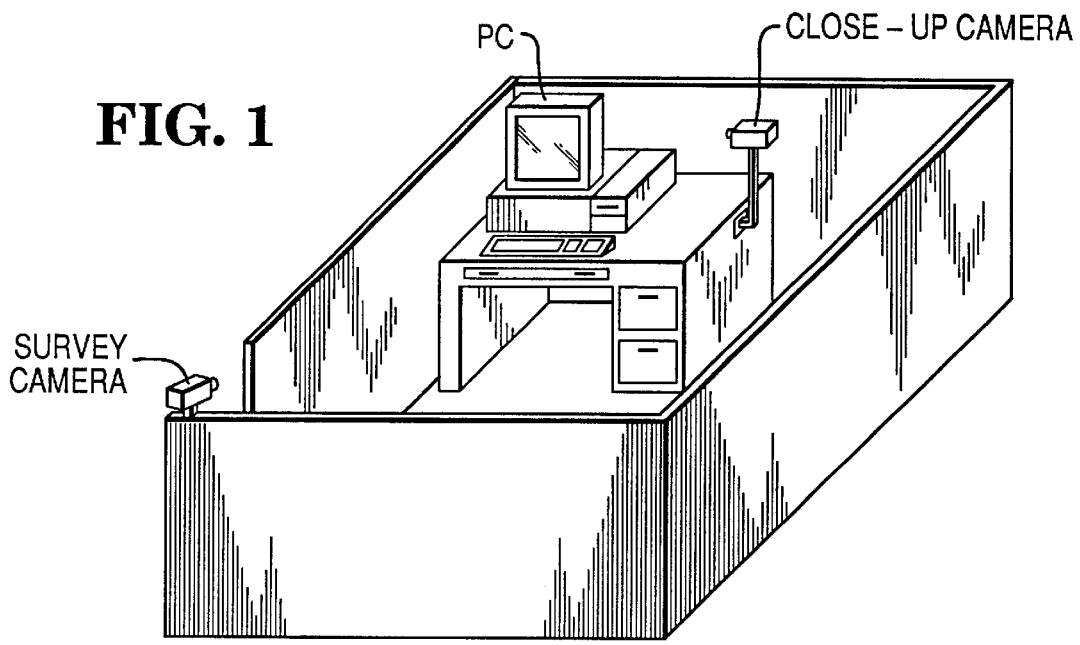
FIG. 1 illustrates equipment which enables a person to remotely attend a virtual conference.

One office is shown in FIG. 1.

One of the video cameras (a "survey camera") surveys the entire office from a point near the door, as though the camera were looking into the office. The second camera (a "close-up" camera) is located next to the computer, and provides a close-up view of the computer user. The second camera gives the "computer's view" of the user.

One of the cameras can serve a second purpose: it can be used as an optical scanner, for capturing images of documents and drawings. The computer is equipped with a frame grabber for converting the image seen by the camera into a bit-mapped file. Alternately, an optical scanner can be used for capturing these images.

These individual systems are located at different geographic locations, and, when a virtual conference is to be held, become connected to a central, host, computer (or multiplicity of host computers) via the proper combination of Local Area Networks (LANs) and Wide Area Networks (WANs).

Initiation of Conference

A person requesting a conference informs the host computer by appropriate means. For example, the Requester can "click" a pointing device onto a "conference icon," such as that shown in FIG. 2, on his display screen. In response, his local computer sends the proper signal to the host. Now, the host must be given several items of information, which can, for convenience, be divided into two groups.

One group relates to the participants:
Who are the participants?
Can others participate without invitations?
Can participants send substitutes?
The second group relates to the conference room:
Where does it exist? That is, where does the data structure reside from which the conference room is constructed. The location must be known to a participant who wishes to find the conference room.
What are the room attributes?
What is the room decor? What paintings are on the walls?
What equipment is present in the room? For example, the host computer may provide the option for any participant to record the entire proceedings of a conference, or any selected part of the proceedings. This option may be represented by an icon in the shape of a tape recorder, which is contained in the conference display screen. Similar options can be present in the form of icons in the shape of telephones, notepads, library books, tables, etc.
The third relates to conference procedures:
What rules govern the conduct of the meeting?
Does the Requester have absolute control of the voice and message interaction among the participants? Or Is the meeting a brainstorming free-for-all, where numerous people can speak at once?
What is the decor of the room?
What happens to the room when the conference is adjourned? Are minutes of the conference kept?
These issues will be considered in detail.

How Does Requester Identify Participants to the Host Computer?

Requester May Have List of Participants in Advance

Figure 2:
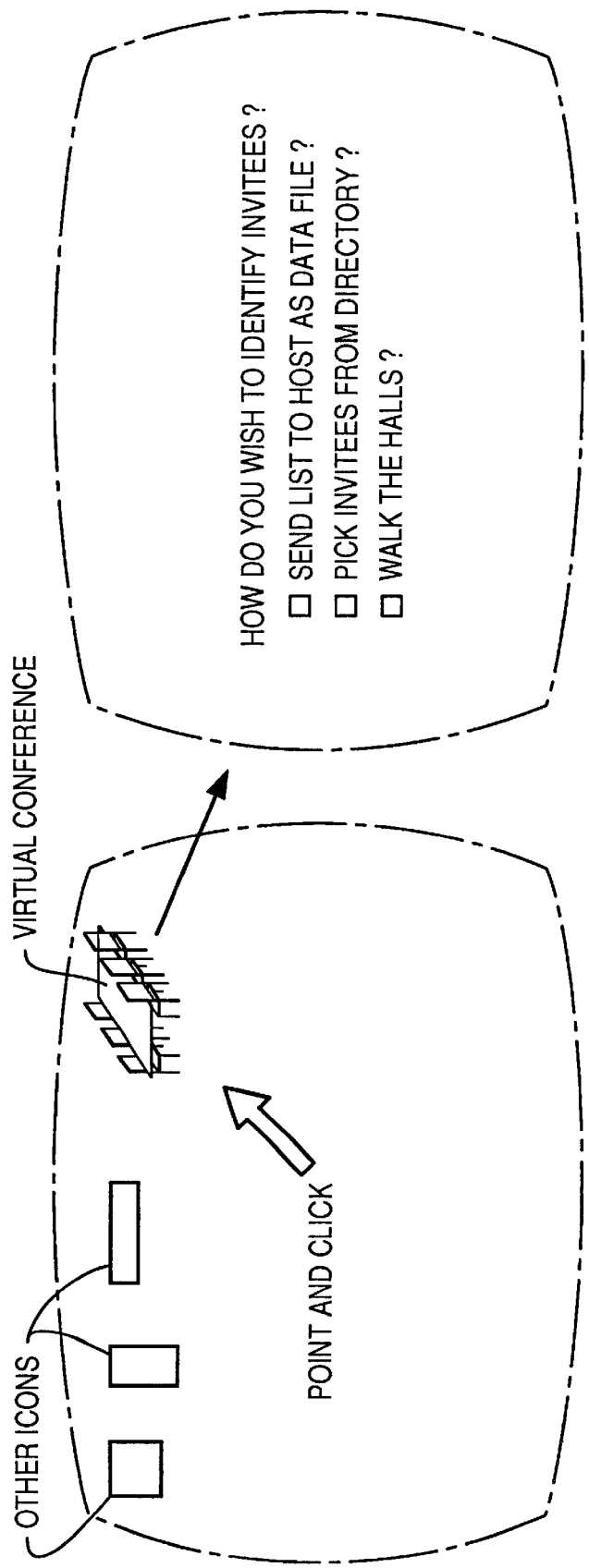
FIG. 2 illustrates computer displays showing menu choices which allow a user to initiate a virtual conference.

The Requester's local computer gathers the information indicated by the menu shown in FIG. 2.

The Requester may have previously prepared a list of participants. If the list takes the form of a data file, he (or she) can send it to the host computer directly. If not, he can convert the list into a data file and sent the data file to the host in several ways.

One, he can type the list into his own local computer, thereby generating a data file.

Two, he can show the physical, printed list to a digitizing device, which generates the data file. One such digitizing device is an optical scanner, which generates a bit-mapped image. The scanner sends the bit-mapped image to the Requester's local computer, which contains Optical Character Recognition (OCR) software. The OCR software translates the bit-mapped image into a data file written in ASCII code, which is sent to the host.

Another digitizing device is the close-up video camera, if equipped with the proper lens. The local computer contains a frame-grabber, which captures a bit-mapped image of the list, and sends it to the OCR software as above.

Once the host obtains the list, the host sends an invitation to each invitee, telling the date, time, place, subject, and any other relevant information about the meeting. One way to send the invitations is by electronic mail, which is known in the art. A second way is for the host to leave an "invitation card," such as that shown in FIG. 3, on the screen of each local computer. Such cards are later discussed.

If Requester Has No List

If the requester has no list, the host can give the option of picking names from a directory of names, akin to a "telephone directory." Another possibility is for the host to present the "telephone directory" in a more graphical format, such as the following.

(The inventor points out that the following invitation procedure can also serve as an actual conference, but held between the inviting person and the person invited. After the inviting person successfully establishes communication with the invitee, the inviting person, if desired, can order the host computer to provide an entire conference room, or selected equipment from the room, such as a recorder, for the convenience of the two parties. Further, the two parties, during their conference, can "walk the halls," and invite other participants, thereby expanding the conference to include additional participants.)

Figure 4:
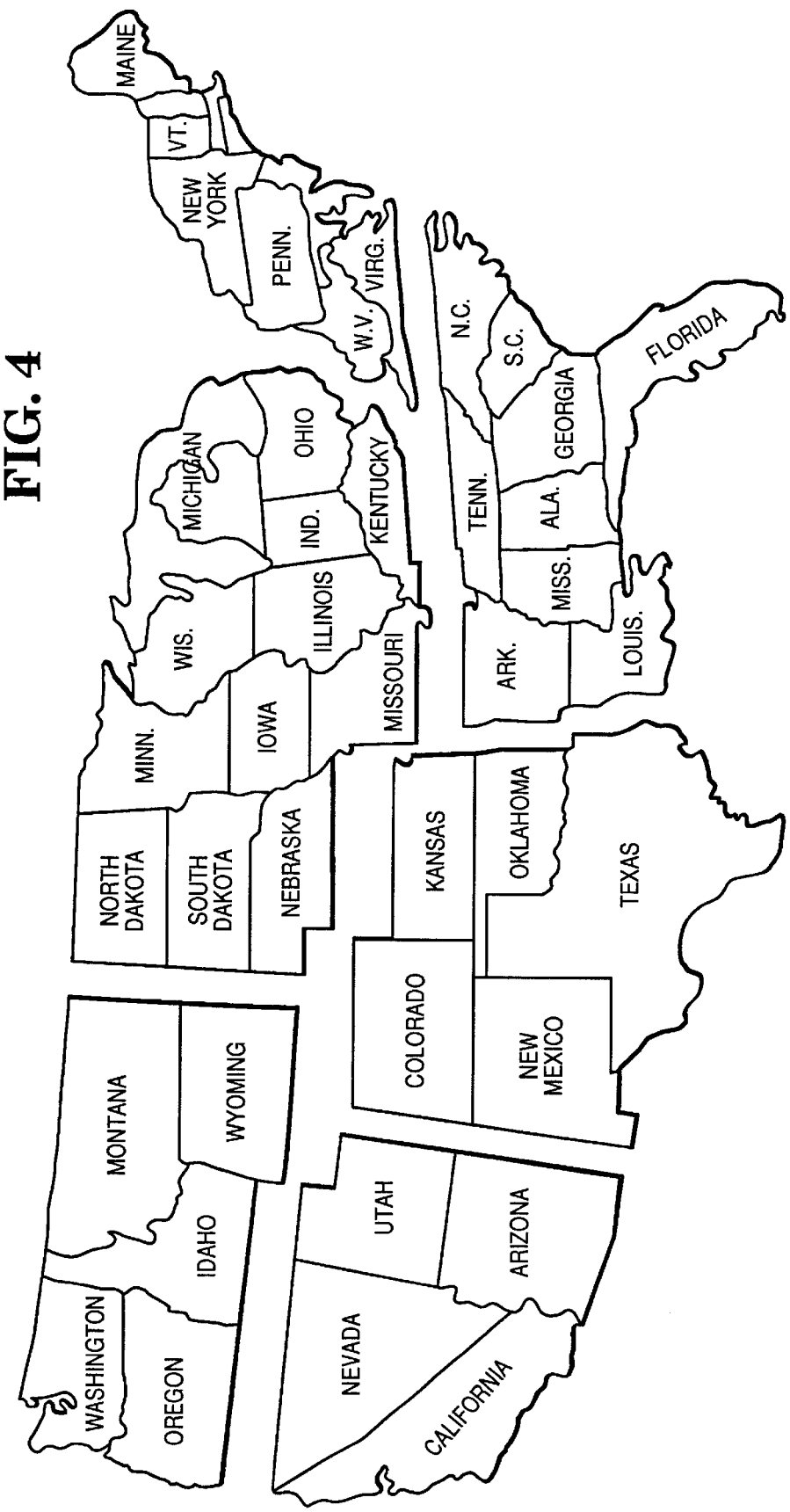
FIGS. 4, 5, and 6 illustrate a type of "telephone directory," in which the persons listed are not listed alphabetically, but are listed by geographic location.
Figure 5:
Figure 6:
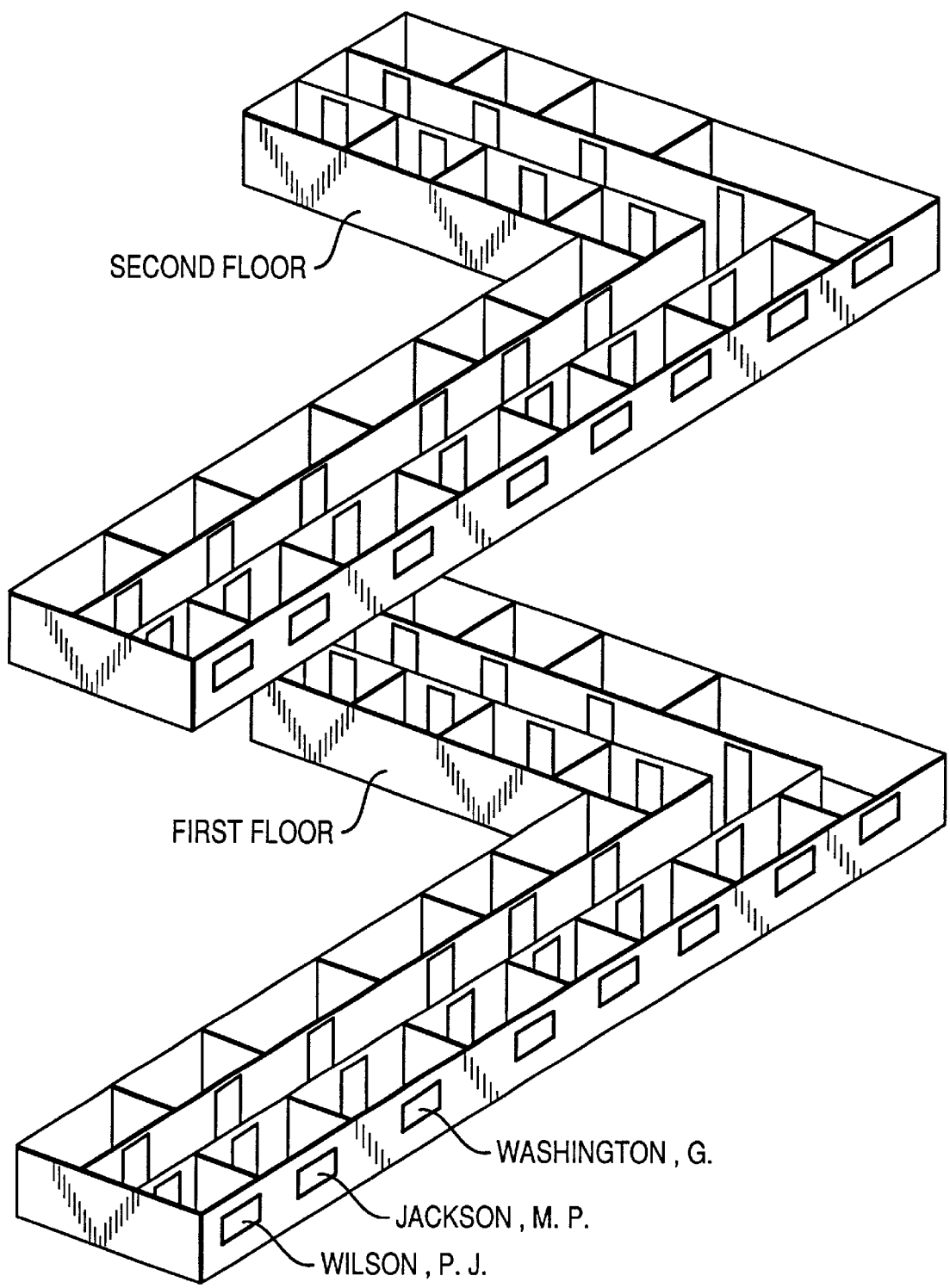

Assume that the Requester wishes to invite fellow employees to the conference. The host computer first displays a map of all locations of facilities of the company, such as in FIG. 4. The Requester picks a state. The host displays the state, showing all company facilities, as in FIG. 5. The Requester picks a facility. The host shows the facility, in exploded form, as in FIG. 6.

Figure 7:
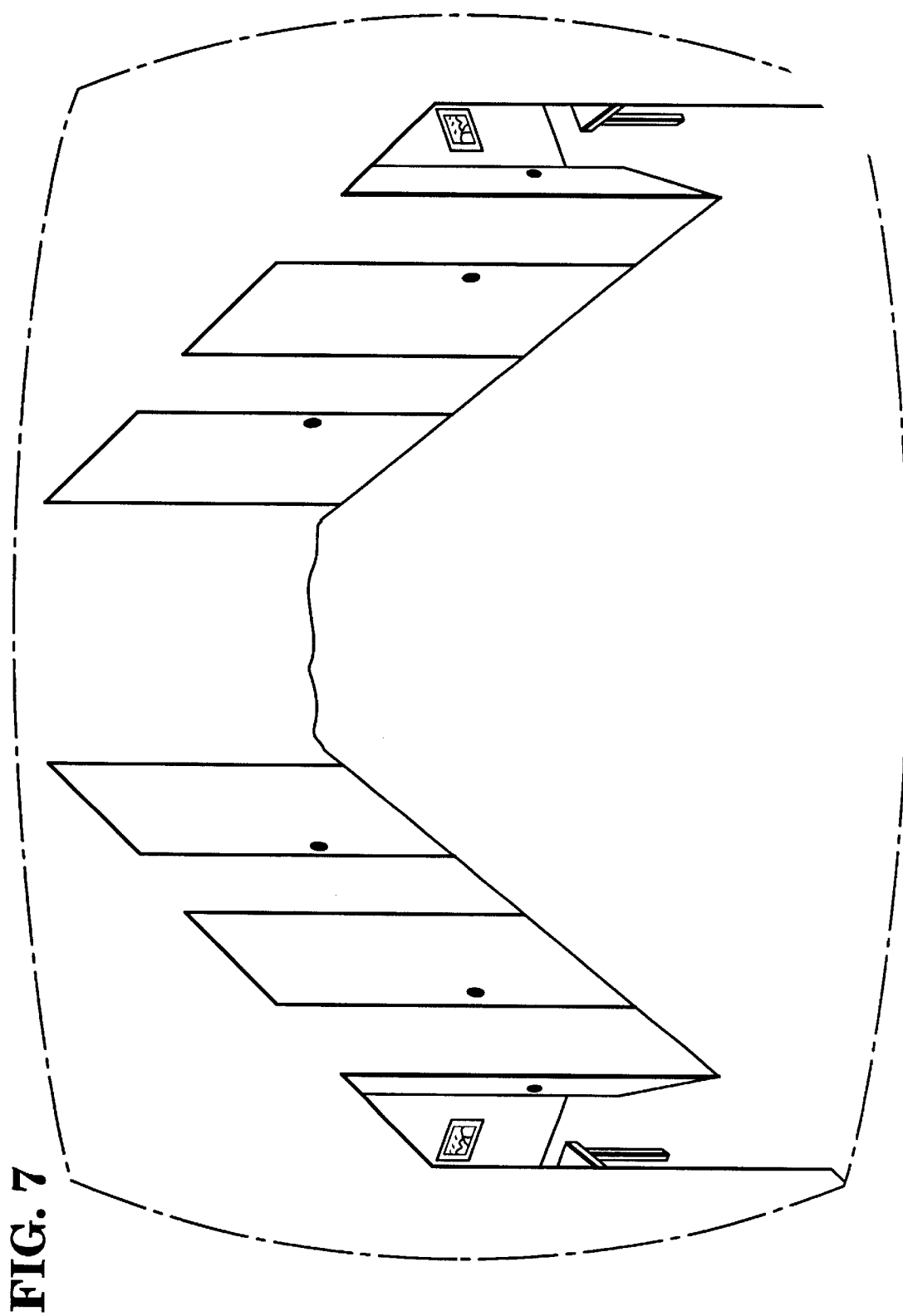
FIG. 7 illustrates a computer display showing a virtual hallway. Behind each door is a person's office. Each office contains the equipment shown in FIG. 1. The person viewing the hallway can look into each office (if allowed to do so) via a connection made with the cameras shown in FIG. 1.

Now the Requester can "walk the halls." The host shows an image of a hallway, as in FIG. 7. Each door bears a name. The Requester scrolls along the hallway, until he reaches an invitee's door. The door can be open, closed, or ajar. The status of the door is under the control of the person occupying the office in question, via that person's local computer.

Door Closed

If the office occupant does not wish to be interrupted by other people, the occupant instructs the conferencing system to close the door. Under such an instruction, the conferencing system shows a closed door to all Requesters who are "walking the hallway." In a similar way, the occupant controls whether the door is fully open or ajar.

Door Open or Ajar

If the door is open, then the Requester sees the image which the survey camera sees of that person's office. That is, the Requester can look into the Invitee-Occupant's office.

If the door is ajar, the Requester is given the option of "peeking" into the office. That is, the Requester is given momentary access to the survey camera, for a period such as five seconds.

Gaining Invitee's Attention

Requester Pops his Head onto Invitee's Display. Once the Requester has located the Invitee's office, the Requester must gain the attention of the Invitee. (The reader is reminded that the Requester is not physically present at the Invitee's office door; the Requester is "virtually present." The Requester is physically present at a computer present in another office. The computer is linked to the survey camera located at the Invitee's office.)

One option is to allow the Requester to instruct the host computer to place a small picture of the Requester onto the Invitee's computer display. The picture beckons the Invitee's attention. This procedure is somewhat analagous to real life: in real life, the Requester can pop his head into the Invitee's office and announce the conference.

The image placed onto the Invitee's screen is that seen by the Requester's close-up camera, and occupies a small portion of the invitee's display. The Invitee has the option of blocking such beckoning, by instructing the host computer to block such interruptions.

If the Invitee wishes to respond to the Requester, the Invitee clicks a pointing device onto the picture, and the host establishes video and audio connections between the two local computers.

Requester Knocks. Another option is to allow the Requester to "knock" on the invitee's "door." In this case, the Requester instructs the host to cause the Invitee's computer to issue a knocking (or chiming) sound. When the Invitee responds, the host establishes the video and audio connection, as above. As above, the occupant can instruct the system to block all interruptions, including "knocking."

The Requester tells the Invitee of the upcoming meeting. The Requester proceeds to the doors of the other invitees, and repeats the process.

Requester Leaves Invitation "Card"

It is possible that the Invitee must decline the invitation to attend the conference. In such a case, the host should not connect the Invitee when conference time arrives. To ascertain whether the Invitee should be connected, the host asks the Requester which Invitees should be connected.

Figure 3:
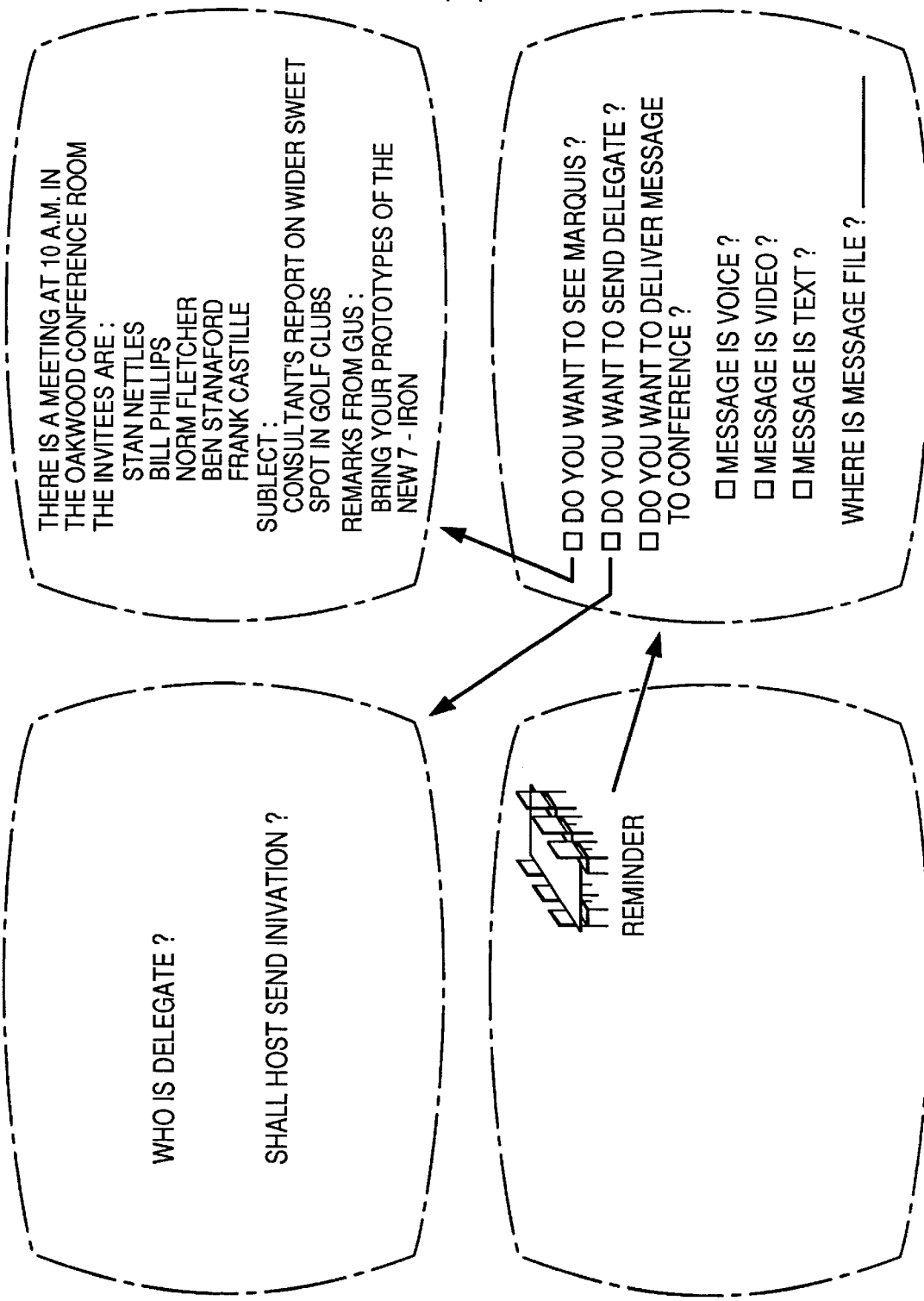
FIG. 3 illustrate further menu choices.

This inquiry can be made as the Requester leaves the office of each Invitee, while "walking the halls." For each Invitee who will attend, the host creates an "invitation card" (ie, an icon) and leaves it on the display of the Invitee, as a reminder of the conference, as shown in FIG. 3.

The invitation card is an active icon, which provides access for issuing commands to the host. For example, when the Invitee clicks the pointing device onto the icon, the local computer presents a screen which displays information about the conference, such as date, time, so forth, as shown in FIG. 3. This display is preferably a window which can be shrunk to a convenient size, and left on the screen by the Invitee to serve as a marquis announcing the meeting.

The marquis can be useful for a local computer which is located in a conference room, instead of an office, and which is used by several Invitees at once during the conference. That is, the marquis constantly advertises information about the upcoming conference, somewhat as a "reserved" sign does for a physical conference room.

The invitation card icon provides access to other options, as will be explained below.

Host Computer Knows Identities of Invitees at this Time

Host Computer Needs Additional Information

At this time, the host knows the identities of the invitees. Several additional details must be resolved before the meeting begins.

Can Invitee Send Delegate? It is possible that, after an Invitee has accepted an invitation, something may prevent the Invitee from attending the forthcoming conference. That is, the Invitee will be an Absentee. Ordinarily, this would create a small problem: the host computer is planning to connect the Absentee's local computer with the others for the conference, but the Absentee will be not be present. If the Requester has allowed Invitees to appoint Delegates to attend in their places, the Invitees may appoint one, in the following ways. (The menu used for this purpose is shown in FIG. 2.)

Row to Appoint Delegate. The Absentee can click onto the invitation card left on the display, and obtain access to the host computer. The host computer then presents several options to the Absentee. The Absentee can designate a Delegate, and assign to the host the task of transmitting an invitation to the Delegate.

Alternately, the Absentee himself informs the Delegate of the new appointment to attend the meeting in customary ways, such as by telephone.

Where Does the Delegate Attend the Conference?

Absentee's Office. The Delegate can attend the meeting at several locations. For example, the Delegate can use the Absentee's office. This can be preferable, because it does not disrupt the host computer's connection scheduling.

Delegate's Own Office. Alternately, the Delegate can use his own office. In this case, the host computer must be notified, so that the host can connect to the Delegate's office. The Absentee performs the notification by clicking on the invitation card, which causes the host to provide a menu of options to the Absentee. The Absentee instructs the host to substitute the Delegate for the Absentee.

Requester Imposed Confidentiality

Another alternate is required if the Requester has imposed the requirement that the meeting be confidential, or other restrictions on access, as will be explained later.

Key Needed for Admission. At the time when the Requester imposed confidentiality, the host computer asked whether Invitees may send Delegates. If the answer was "Yes," then the Requester is prompted by the host to give the Absentee-Invitee a "key," which enables access to the meeting.

Figure 8:
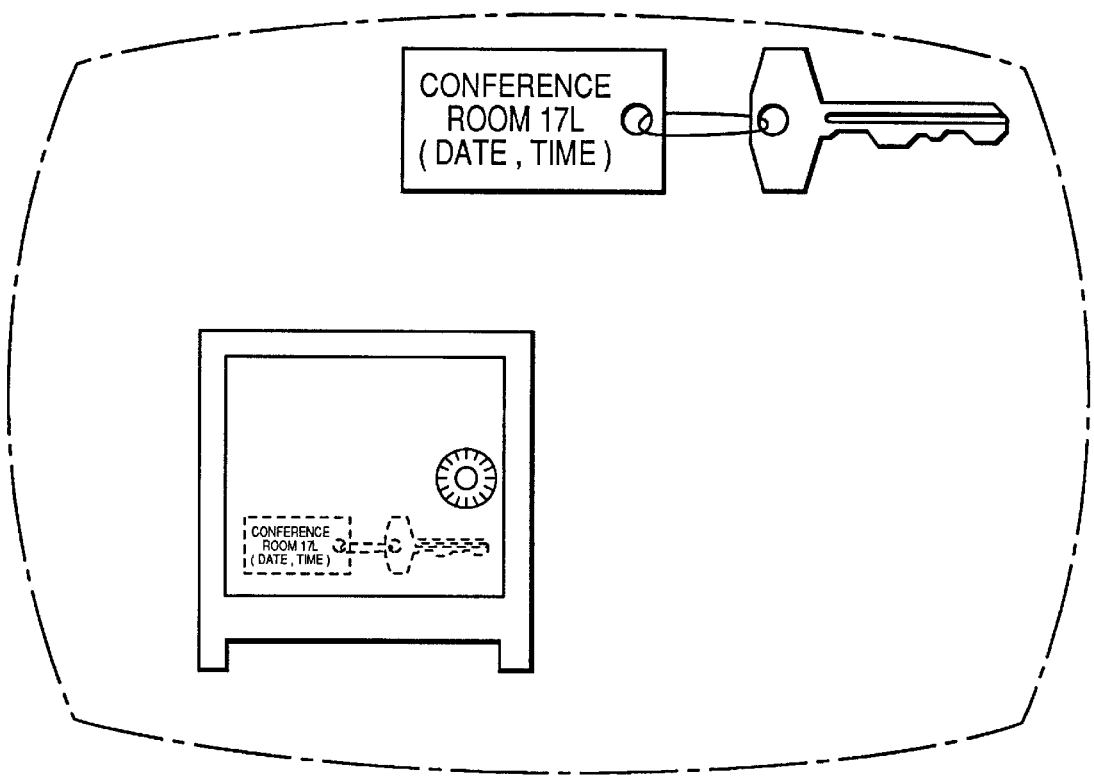
FIG. 8 shows key-icons which can be used to gain entry to a virtual conference which is not open to the general public.

For example, the key is, essentially, a block of data, or a code. The Requester can leave the key in his local computer, in the form of an icon residing on the display, as shown in FIG. 8. Anyone entering the office can use the key.

Alternately, the "key" icon is contained within a "vault" icon, as shown in FIG. 8. Now, a user must use a "combination" to the "vault" to obtain the "key." In this latter example, the the "combination" (ie, a pass-code) is obtained from the Absentee-Invitee in some appropriate way. At conference time, the Delegate opens the "vault," obtains the "key," and enters the conference room, by using the key.

This procedure is analogous to real life: the Absentee can leave the key to the conference room on his desk. Or the Absentee can hide the key, or leave it in a locked drawer.

If the Delegate wishes to attend the conference at his or her own office, the "key" can be passed to the Delegate via the LAN-WAN network set up by the host. That is, as shown in FIG. 3, one of the options on the invitation icon is to pass the key to a Delegate. The host transfers the key, and any necessary information, to the Delegate.

Levels of Confidentiality

Several levels of confidentiality are possible. For example, the Requester can instruct the host to restrict access solely to the Invitees' computers, and to disallow "key-passing," which would enable other computers to link to the conference.

As another example, the Requester can state that "Spectators" can observe the conference. That is, any person can contact the host, obtain a list of ongoing conferences, select a conference room, enter it, and observe the proceedings.

As a third example, the Spectators can participate in the meeting. In such a case, they become "Walk-in-Invitees." The procedures applicable to Invitees apply to them.

Create Conference Room

Figure 9:
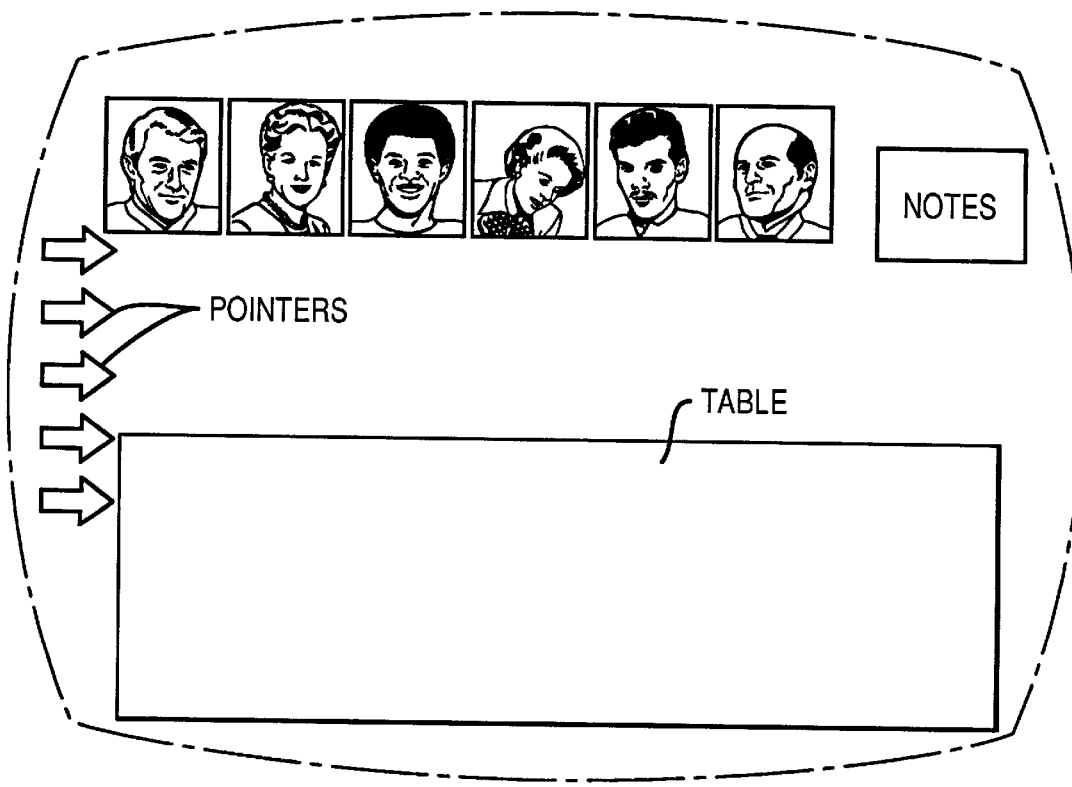
FIG. 9 shows one type of video screen which is generated by the host computer, and which is distributed to all participants in the conference.

Once these preliminary matters are established, the host creates the conference room. The host does this by creating a common image, such as that shown in FIG. 9. The common image includes a picture of each invitee, a "table," and the room decor.

Pictures of Participants. The pictures of the invitees can be the actual images seen by the each invitee's close-up camera, or can be a photograph taken from the host's memory. In some situations, the photograph may be more convenient.

The pictures are initially grayed-out, meaning that they are either not presented in full contrast, or not in full color. Each will be given full color and contrast when the respective invitee arrives at the conference.

When time for the conference has arrived, the host computer takes roll of the participants as each arrives. While the early arrivals are waiting, the host computer provides them the options of playing games, listening to music, or seeing news or wire services, as indicated.

The host can remind the arrivals of the upcoming meeting at various intervals, such as five minutes, two minutes, one minute, thirty seconds, by sending a message to their computers.

When all participants have arrived, the meeting begins.

The table is a common display area which is shown to, and available for work by, each Invitee. That is, the image sent to But each Invitee can modify the image, because the host receives input from each Invitee, and modifies the. image in response. Some of the modifications are the following:

Pointers. Each Invitee has a pointing device (or, alternately, a keyboard which can move a cursor). Each local computer transmits its cursor position to the host. The host positions each Invitee's cursor on the table, as appropriate. With this cursor positioning, each participant can point to items which he or she verbally discusses, using the audio link.

Figure 10:
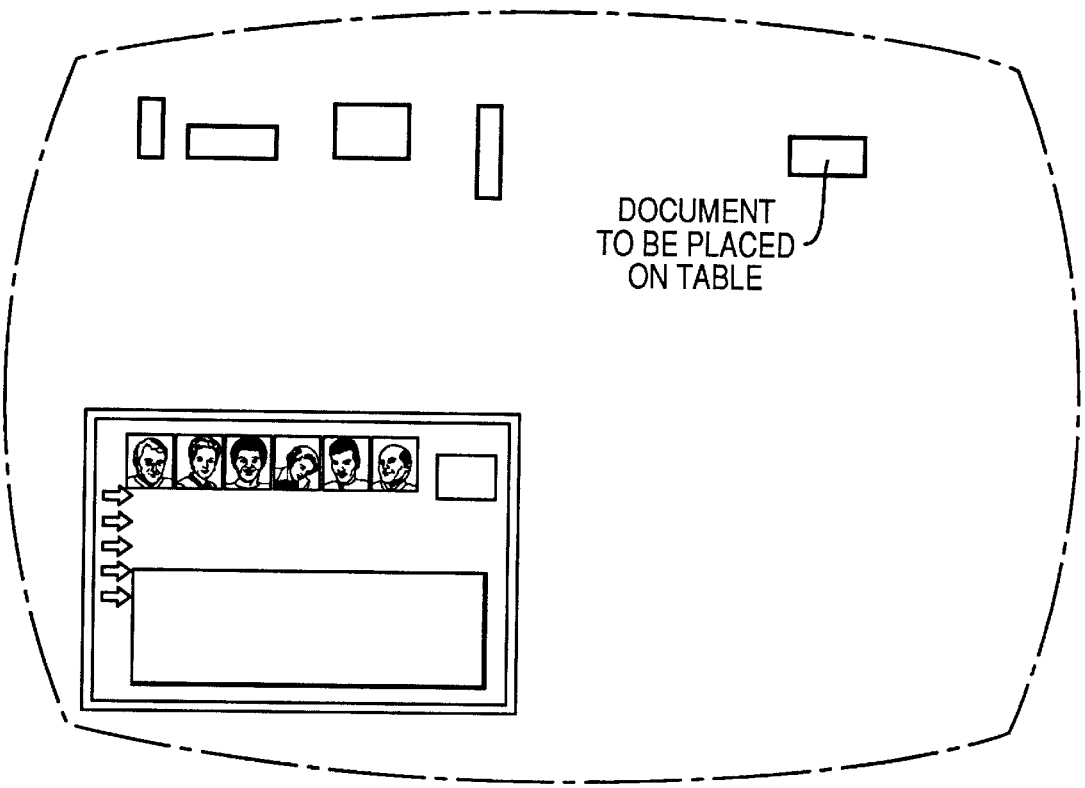
FIG. 10 shows a screen, of the type given in FIG. 9, but further including a "Document to be Placed on Table," which was transmitted to the host by a participant, and which the participant will show to the other participants by placing it onto the "conference table."
Figure 11:
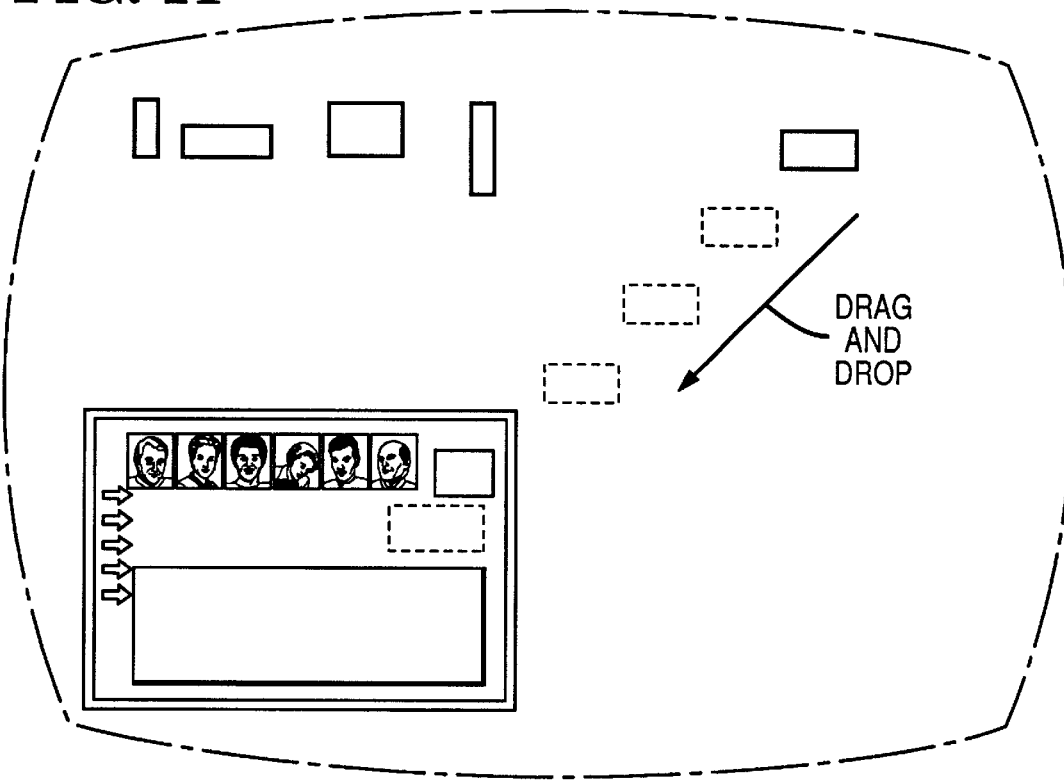
FIG. 11 shows the sequence of events by which the "Document . . . " of FIG. 10 will become displayed.

Placing document on table. Each Invitee can transmit a file (of any suitable kind: data, text, or graphic) to the host, and the host will place the file onto the table, where all participants can see it. To place a document on the table, an Invitee performs a "drag-and-drop." That is, the invitee shrinks the window of the conference room to the size shown in FIG. 10. The private work area outside the window displays the icons representing the invitee's programs and data files. The Invitee drags an icon onto the table, as shown in FIG. 11, and double-clicks (or actuates) the icon. The icon blooms into an image dictated by the type of file which the icon represents (graphic, text, etc.)

Modifying document. Each Invitee can write on the document, using a "paint"-type program and a pointing device. Each Invitee can stretch or shrink the document, as allowed by the "Paint" program.

Figure 12:
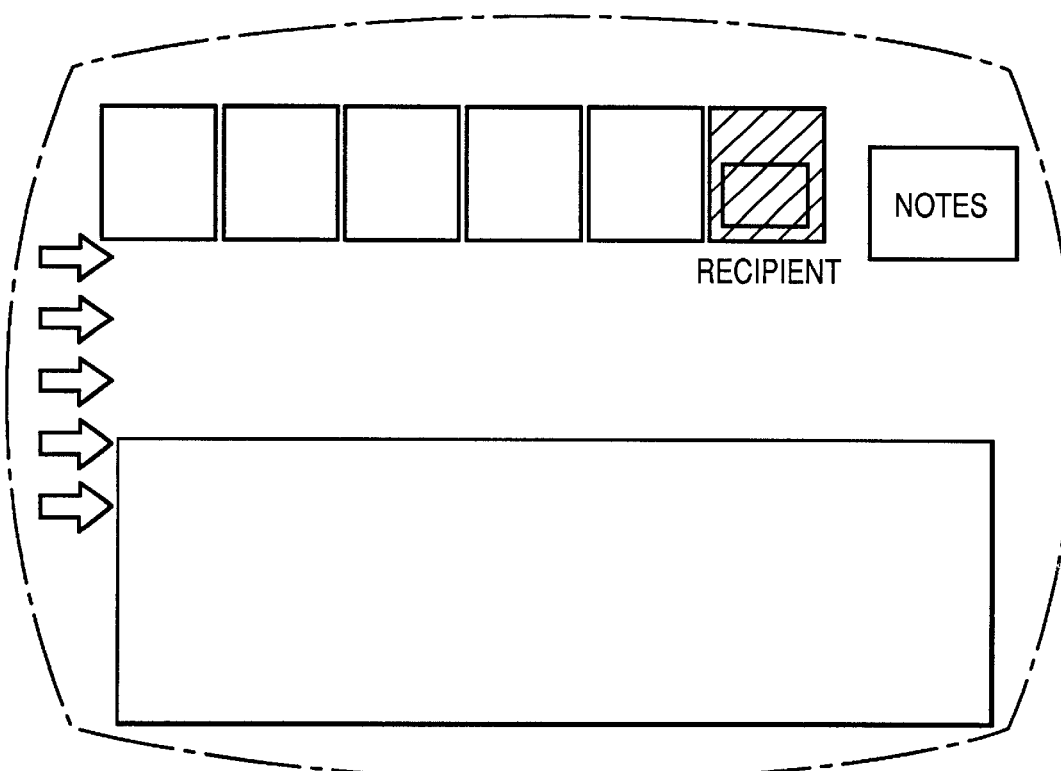
FIGS. 12 and 14 illustrate display screens which can appear when one participant passes a note to another.

Pull-down sheets/"writing on the walls". The conference table contains a "notepad". Any Invitee can pull down a note sheet, as shown in FIG. 12, by using the pointing device, and write on the sheet. (Of course, the Invitee could write directly on the table, but the table may be covered with documents. The pull-down sheets cover whatever is on the table, and provide a clean writing surface. A subsequently pulled-down sheet would cover a previous pulled-down sheet.) The pull-down sheets can be enlarged at any time, to provide a larger writing surface, and can be placed at any location in the conference room, including the floors and walls. The pull-down sheets can be opaque or transparent. Further, the host can be instructed to associate each sheet with the document onto which it was placed, so that, at a later time, the sheet can be associated with the document, in order to see the notes which were written on the document. In this way, the participants can, in effect, "mark up" the documents on the table, without actually defacing the documents.

Minutes of Conference

The Requester is given several options of recording the conference. One option is a recording, in real-time, of all events and discussions occurring during the conference. This can be done by recording the sequence of images occurring on the common screen, together with the audio information.

Another option is to record only upon demand, and to record only the demanded material (ie, either the common screen, or the audio, or both.) For example, when a given document is placed onto the table, the Requester can order the host computer to record the screen, and to record all subsequent conversations, until the Requester terminates recording. In addition, participants can order their own recordings of selected time intervals. One approach is for the host to record all proceedings in their entirety. Meanwhile, the host listens for recording requests form the participants. When a request is received, the host records start and finish markers, which identify the recorded material requested by the participant.

Another option is for the host to sense the placement of a document onto the table. The host then asks whether the screen should be recorded. The inquiry can be made by a pulsing sign on the Requester's screen, such as "RECORD?" If no answer is received within a predetermined time, such as three seconds, the host does nothing.

A third option is for the host to be equipped with voice recognition equipment, which can be quite elementary. A predetermined, unusual, speech pattern, such. as "record this now" prompts the host to record the screen, together with ensuing conversation, until the host receives a second unusual speech pattern, such as "stop recording now."

The reason for using unusual speech patterns is that elementary speech recognition equipment can recognize such patterns more easily, and will not confuse common sayings with the unusual patterns.

Adjournment of Conference

The Requester is given the options of whether to save any recorded proceedings, which to save, and which to erase.

Additional Considerations

Figure 13:
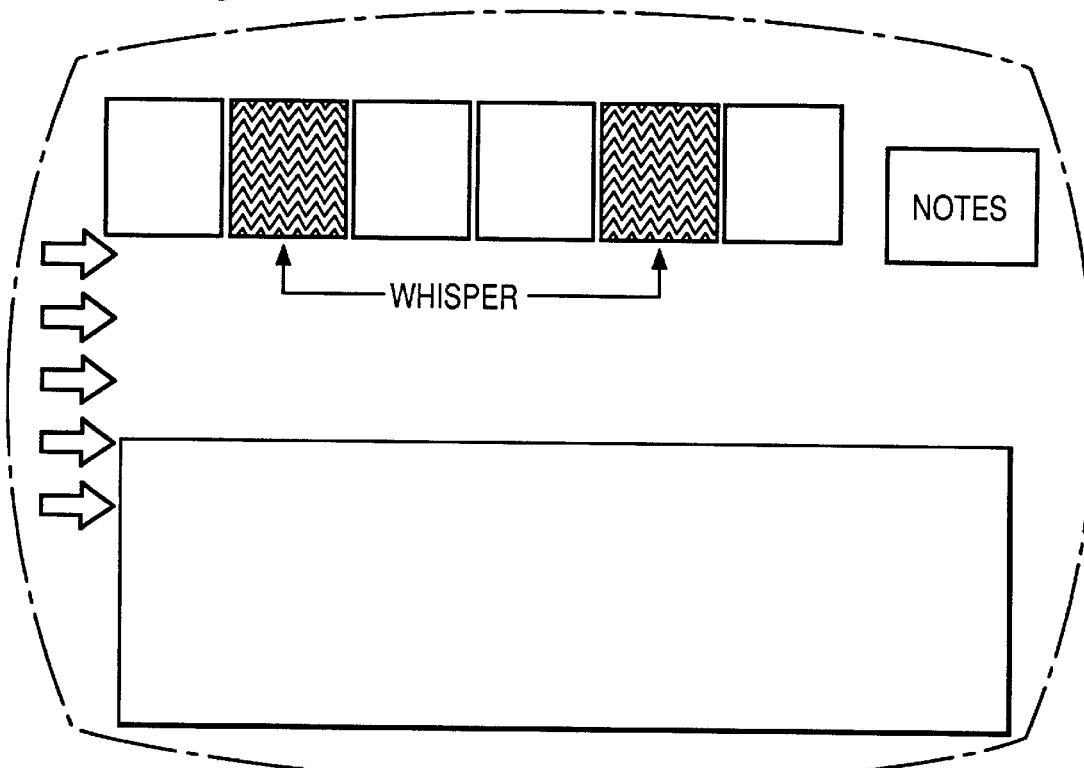
FIG. 13 illustrates one display screen which can appear when one participant "whispers" to another.
Figure 14:
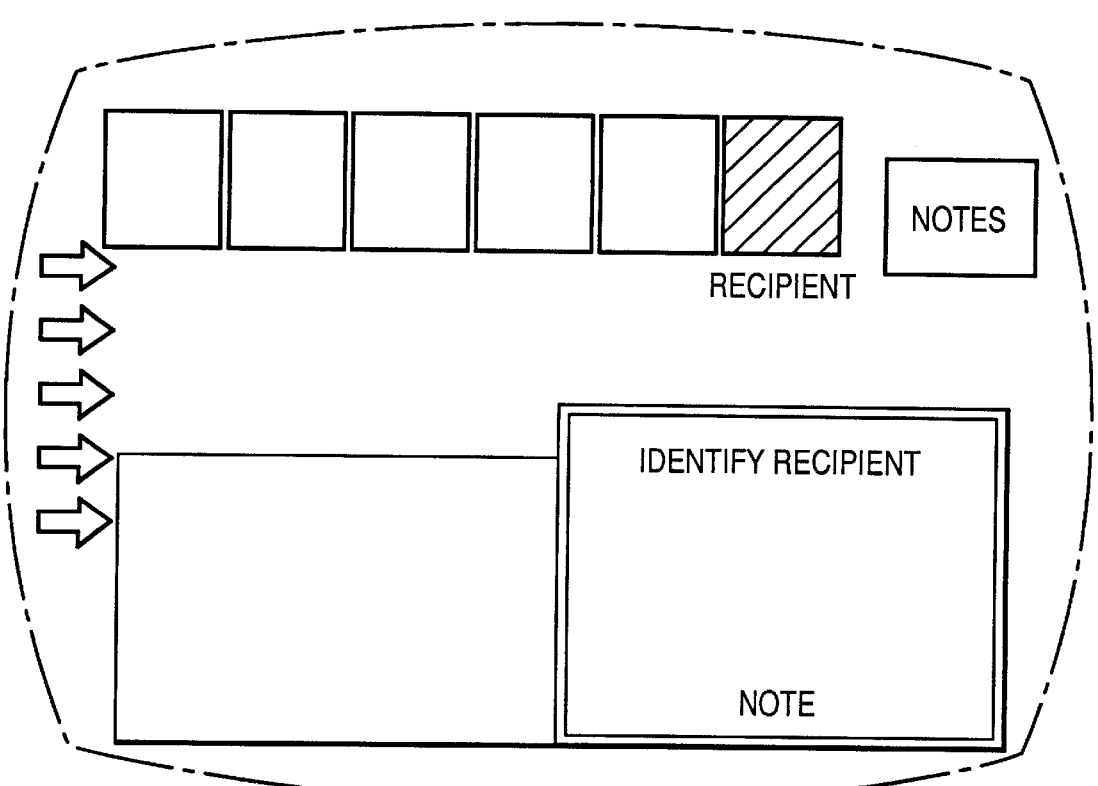

1. Whispering. Any participant can whisper to another, without being-heard by others. For example, one party can click onto the picture of another. The picture becomes grayed, or otherwise different from the others, as shown in FIG. 13. In addition, a prominent message is displayed on both parties' displays, such as "Whisper Mode is Active."

At this time, the host makes an audio connection between the two whispering parties, and between nobody else. The parties can communicate, until they terminate whisper mode.

2. Note-Passing. Parties can pass notes. One person can write a note, on the enlarged "NOTE" in FIG. 13, and drag it to the picture of another party. When the other party sees the note on his picture, as in FIG. 12, he can drag it to a private viewing area, double-click it, and read it. No other people are aware of the passed note.

3. Meeting Invitations and Meeting Room Keys.

Before an invitation list is compiled, the level of invitations must be specified by the invitor. Three levels of invitations are considered.

1. an invitation is for the Invitee only.
2. an invitation is for the Invitee, but can be passed to a delegate, who will attend in place of the Invitee.
3. an invitation is an open invitation to anyone wishing to attend.

Invitations contain "keys" which conform to the above invitation level. Level 1 keys may not be passed to any other person and may not be copied. Level 2 keys may be passed to exactly one other person and may not be copied. If the key is returned to the original invitee than it may be passed again. Level 3 keys may be freely distributed and copied. The meeting is considered to be public.

The meeting room "knows" about each key and its invitation level. Persons with improper keys are not admitted to the room. A person without a key may be admitted to the room only by someone already in the room or by the person responsible for the room.

Invitations and keys are distributed electronically. The key is an electronic object attached to the invitation. Keys may be copied and redistributed, if permitted, or sent to another individual, if permitted. Keys may be E-mailed to persons or to positions (i.e. Operations Shift Manager) where the responsible individual will change. Confirmation of delivery and participation is provided.

4. Meeting Room Creation. Meeting Facilitator (or Requestor) creates meeting room on a host computer which is accessible to all Invitees. The meeting room door is accessible from a hallway which has doors to other meeting rooms. Displayed on the hallway walls may be various artwork which provides a sense of location and visual reference to persons "walking the hallway". Persons may associate clusters of rooms as being "physically close". On the outside of each door is the room name, selected by the room creator. Names may reflect the nature of the room or simply provide an identity, such as the "Sales Meeting Room" or the "Einstein Room". The door may also indicate if the room is occupied, the number of occupants, their identities, whether the current meeting is open or closed and the scheduled time for the meeting(s).

Room creation includes selection of location in hallway, color of doors and walls, equipment in room (i.e. table size, flip chart, file cabinet) and meeting tools (electronic secretary, brainstorming module, on-line databases). The door lock is set to accept only the appropriate keys. The door may be set to be open (persons in the hallway may look inside and enter freely-no key needed), closed (must use a key or knock to enter), or partially open (persons in the hallway may briefly glance inside but must use a key or knock to enter).

Rooms may also have doors to committee rooms or child-rooms. Each child-room is created in the same way as the parent room and may have unique attributes (door locks, color, tools). A child room is dependant on the parent room for access, existence, etc. A person may not enter the child-room if he cannot enter the parent room. If the parent room is destroyed (see below) the child room will also be destroyed (unless steps are taken).

With respect to the above description, hallways are actually rooms with many doors, no tools and with general access to all persons. Meeting rooms are child rooms of the hallway.

5. Entering a Room. When a person wants to go to a room, he first enters the hallway. The user's display shows an image of a hallway with various doors to rooms. The user's entry point into the hallway may set to a default location such as the end of the hallway or to specific locations which are frequently visited. In the hallway, the user may jump to a room or may stroll the hallway. Strolling the hallway allows a user to visually locate himself in the hallway and to view the doors of the rooms a the user walks by. If the name of the room is known, the user may jump to that room by request. If the room or its location are not known or other information is desired, a user may query the hallway. Because rooms are children of the hallway it will respond with locations, number and names of occupants or other public information. Another user could be identified as being in a room who may then be "paged".

On the doors of the rooms are signs indicating the room name, if the room is occupied, the number of occupants, their identities, whether the current meeting is open or closed and the scheduled time for the meeting(s). If the door is open the user may walk in. A key is not required. If the door is partially opened he may peek inside for a brief moment. To enter the user must either knock and be invited in or place his key on the door lock icon. If the door is closed the user may not peek into the room. The user may enter the user room using his key or by knocking on the user door and be invited inside.

Knocking on a door alerts any participants inside the room to the outside user's presence. Inside the room, a user may query the room regarding the outsider's identity or ask for an image or video of outside the door.

To open a door with a key, the user drops the key onto the door lock. If the key is valid and the user has the authority to use the key, the door opens and the user is admitted to the room. The other users in the room are alerted to a new presence and receive any relevant information.

When a user enters a room with no other occupants, a data connection is made between the users computer and the host computer which stores the meeting room. The user is displayed a representation of the room in the condition it was last left. Documents may have been left on the table; drawings written on the walls. Because only one person is in the room, video and audio connections to the room are not established. If the user wishes to record and leave an audio or video message, audio or video connections may be made to the room and the message spooled to storage on the meeting room host. The connections are dropped after the message is complete.

When a user enters a room with other occupants, the data connection is made. Audio and video connections are made if supported by the user, the room and the other users. A small picture of each user is displayed in the meeting room to indicate presence. If video links are enabled than the picture may be replaced with a video signal from the user, typically showing the user. The majority of the display shows the room's table, walls, etc.

6. Inside the Meeting Room. Objects (documents) can be shared in the conference room by placing them on the table. This might be done by dragging an icon of the object from the outside (users non-"meeting room" windows) onto the table. Ownership of the object is still maintained. If the object owner wishes, the object may be copied, borrowed by other users, or given to other users. The object may be altered (changed, annotated) by anyone with permission to do so. If the object is left in the room when the owner leaves, ownership is still retained along with rights and privileges.

Public objects may be created within the room, such as blackboard or flip chart writings, notes or drawings. Paper may be pulled from a public notepad to indicate its "group ownership". Anyone may write on to the page, enlarge it, shrink it, and post it.

Object manipulation is achieved by users individually. Each user's pointer may be used simultaneously for drawing, typing, pointing, writing etc, just as many pencils may write on a single paper simultaneously. If one person removes the "paper", than no user has access to it.

The room may be used to impose discipline on the meeting procedure. For instance, Robert's Rules of Order may be used to prevent a free for all of communication. The room would require that certain procedural issues be followed before allowing a vote, identified or anonymous, to occur (another built in meeting procedure), or before someone was allowed to speak. Within the room a talking queue might be built so that only one person would speak at a time, followed by the next person and so on. An "Interest Meter" might show the interest level of the listeners to a speaker. Perhaps a thermometer type of graph would show the interest level average of each listener voting on a scale of 1–10.

7. Adjourning the Meeting. When a meeting is adjourned, users may leave the room and enter the hallway or they may exit the environment all together. The data, audio and video connections are broken or maintained as appropriate. The room may be left intact or destroyed. If left intact then the room is available, along with all objects stored in the room, for the next meeting. If destroyed, then the objects are destroyed as well if not removed.

If the room is to remain after a meeting, then the objects placed on the table, in the filing cabinet or the writing on the wall remain as well. The security of the door is reset (open, closed, partially open) by the room owner.

8. Destroying the Meeting Room. The room may only be destroyed by the owner. If it is to be destroyed, the room will make the owner aware of any objects which reside in the room which would be destroyed as well. The owner will have the opportunity to remove these objects from the room.

9. Windows Context. Much of the preceding discussion has presumed that the local computers are utilizing Windows®, or an equivalent. "Windows®" refers to an operating system, or "environment," which is publicly available from Microsoft Corporation, One Microsoft Way, Redmond, Wash. 98052-6399. Developers' packages, containing instructions and software, for writing programs which run in the Windows® environment, are also available from Microsoft. However, the invention is not limited to systems utilizing these particular environments.

For example, implementation of dragging-and-dropping, double-clicking to actuate a program, or to cause an icon to bloom into a screen, etc, is within the skill of the art. Further, generation of a hallway, and allowing the user to scroll down it, is known in the art.

10. Persistence of Conference Room. The conference room itself is actually a combination of stored data and computer programs. The data can include the recorded proceedings of the conference described above.

The data and the programs need not be destroyed after termination of a conference. If they are preserved, a person having proper authorization can gain entry to the conference room and examine the proceedings of the conference. That is, both the conference room and the proceedings of the conference have persistence in time.

This persistence allows a person who did not attend the virtual conference in real time to witness it, or parts of it, afterward.

11. Host Can Act as Moderator. The Requestor may wish to hold a conference wherein ideas are freely exchanged among the participants. It is possible that this intent can be defeated by an aggressive person who dominates the conference, and, in effect, maintains a "filibuster."

The host can automatically prevent filibustering, in several ways. One, the host can monitor the speech of each person, and place a limit on the total time allowed to each person. The limit can be overriden by the Requester, or by a vote taken by the host of the other participants.

Two, while one participant is speaking, the host can monitor the audio input of the other participants. The host looks for instances when the speaker refuses to stop talking when the other participants speak. When the host finds such instances, the host issues a message to all participants stating that a filibuster appears to be occurring, and requests a vote as to whether to allow the filibuster to continue.

12. Commercially Available Equipment for use in Invention. The following equipment and software can be used to implement various component parts of the invention.

3D-Graphics Hardware is available in Silicon Graphics workstations, available from Silicon Graphics, Mountain View, Calif.

3D-Graphics Software, such as "Alias Animator," is available from Alias Research, Toronto, Canada.

Screen sharing software, such as "reachout," is available from Ocean Isle Software, Vero Beach, Fla.

Computer-controlled telephones, such as the AT&T model 7506 ISDN, are available from AT&T, Basking Ridge, N.J.

Electronic mail software, such as "cc:Mail," is available from Lotus Development Corp., Boston, Mass.

Video conferencing products, such as video telephones, are available from PictureTel Corp., Peabody, Mass.

Pointing devices, such as the Seiko DT-3613 Graphics Tablet, are available from Seiko Instruments USA, San Jose, Calif.

Figure 15A:
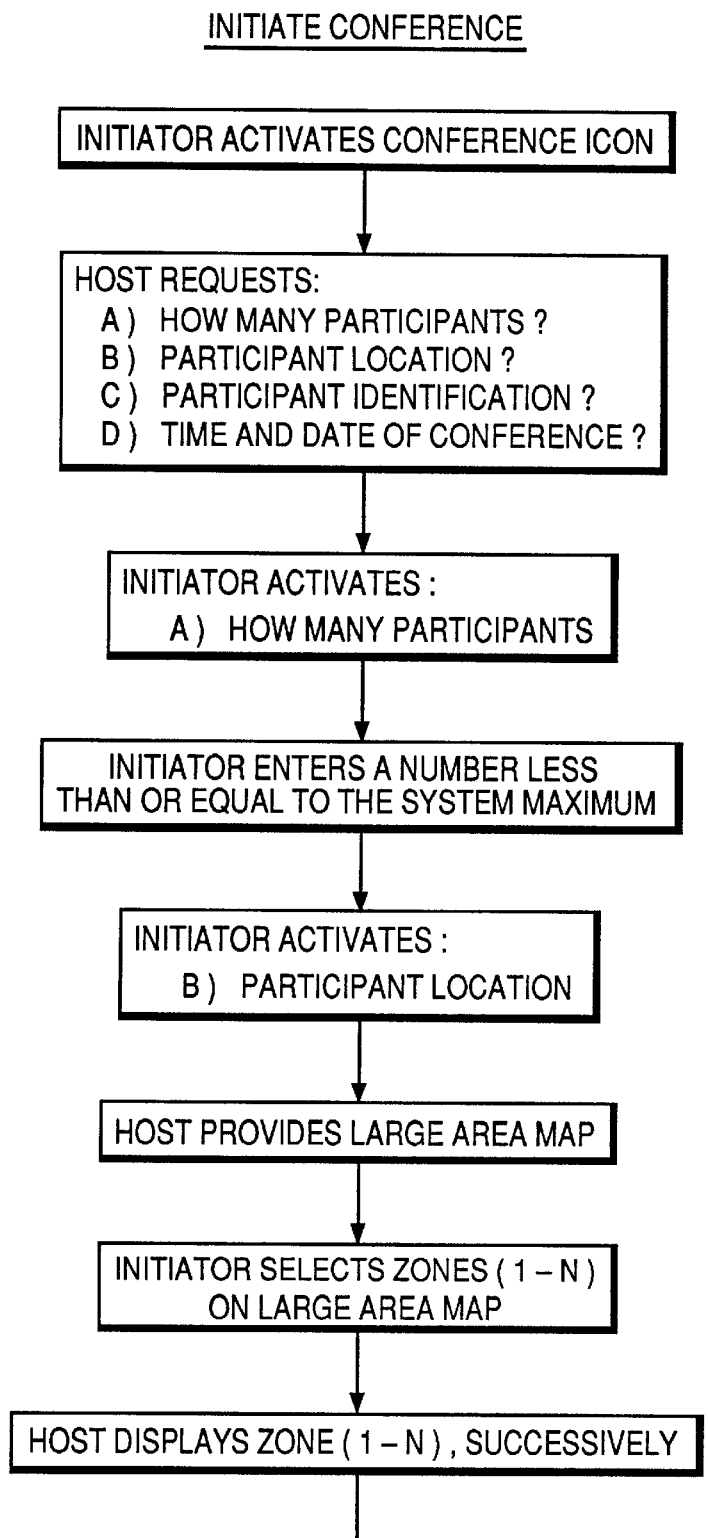
FIG. 15 et seq. provide flow charts which correspond to the Pseudo-code contained in the Appendix.
Figure 15:
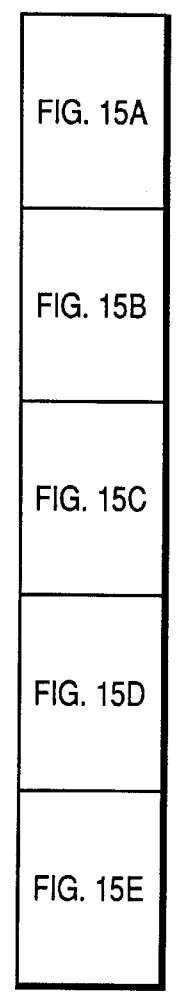
Figure 15B:
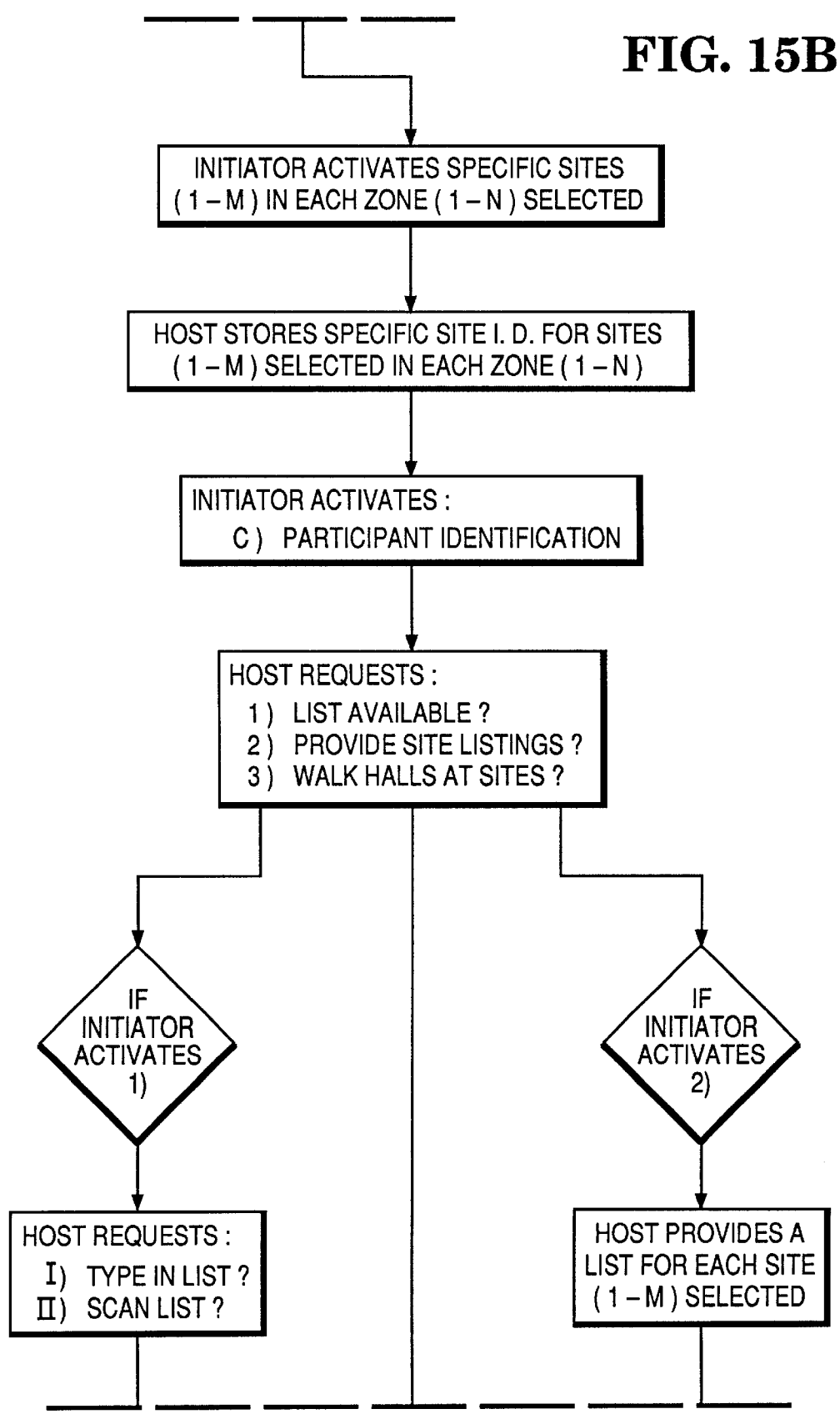
Figure 15C:
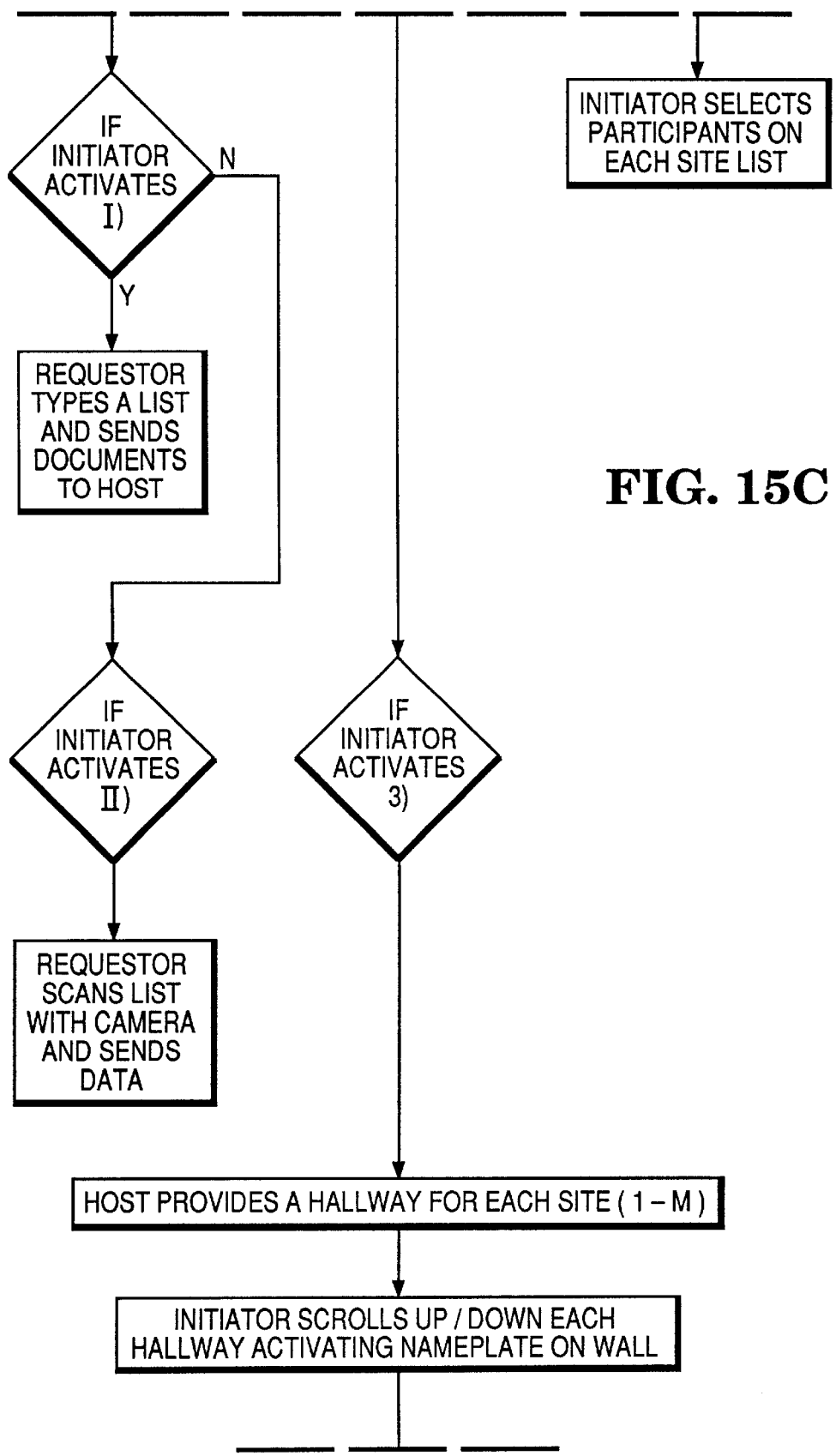
Figure 15D:
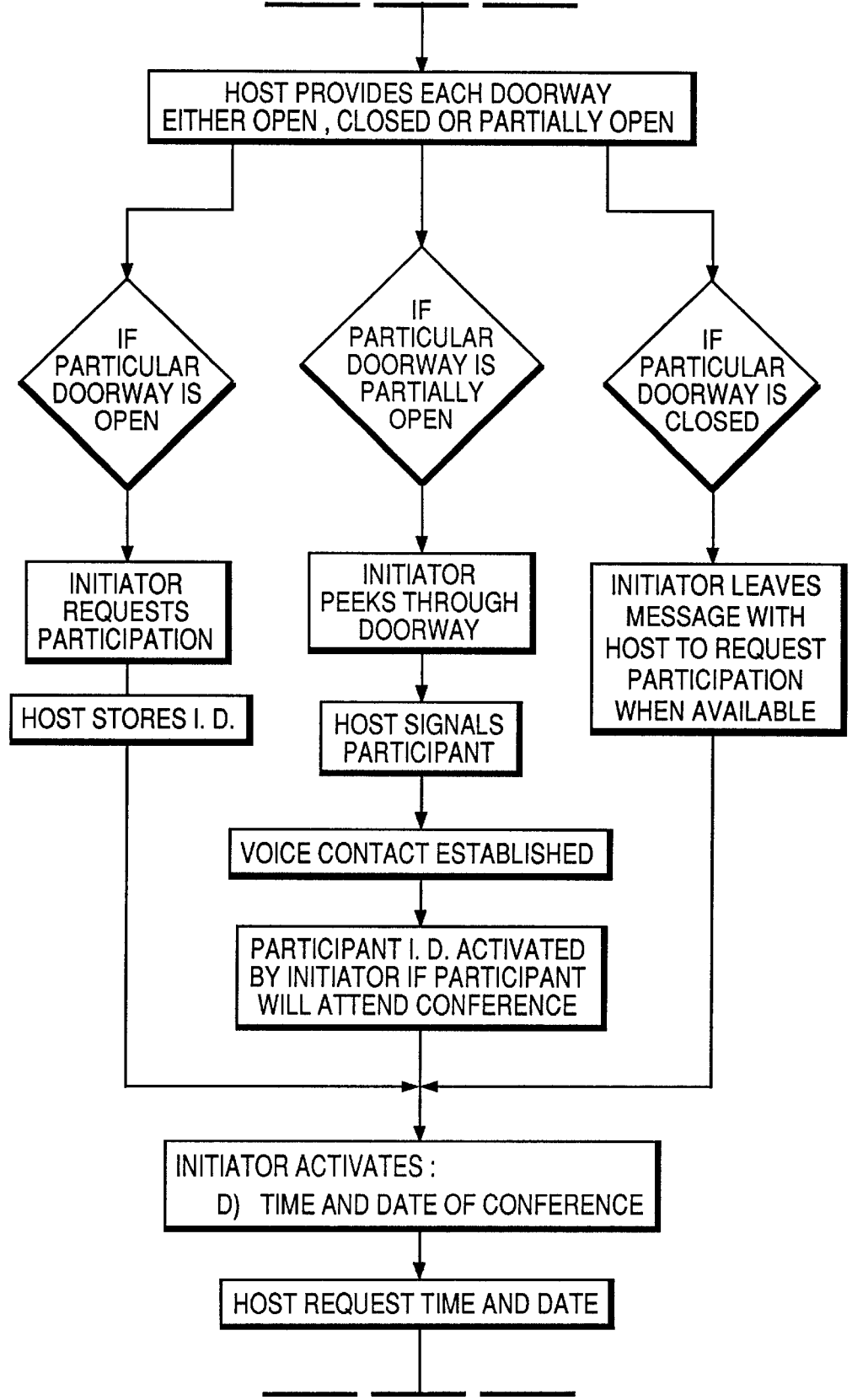
Figure 15E:
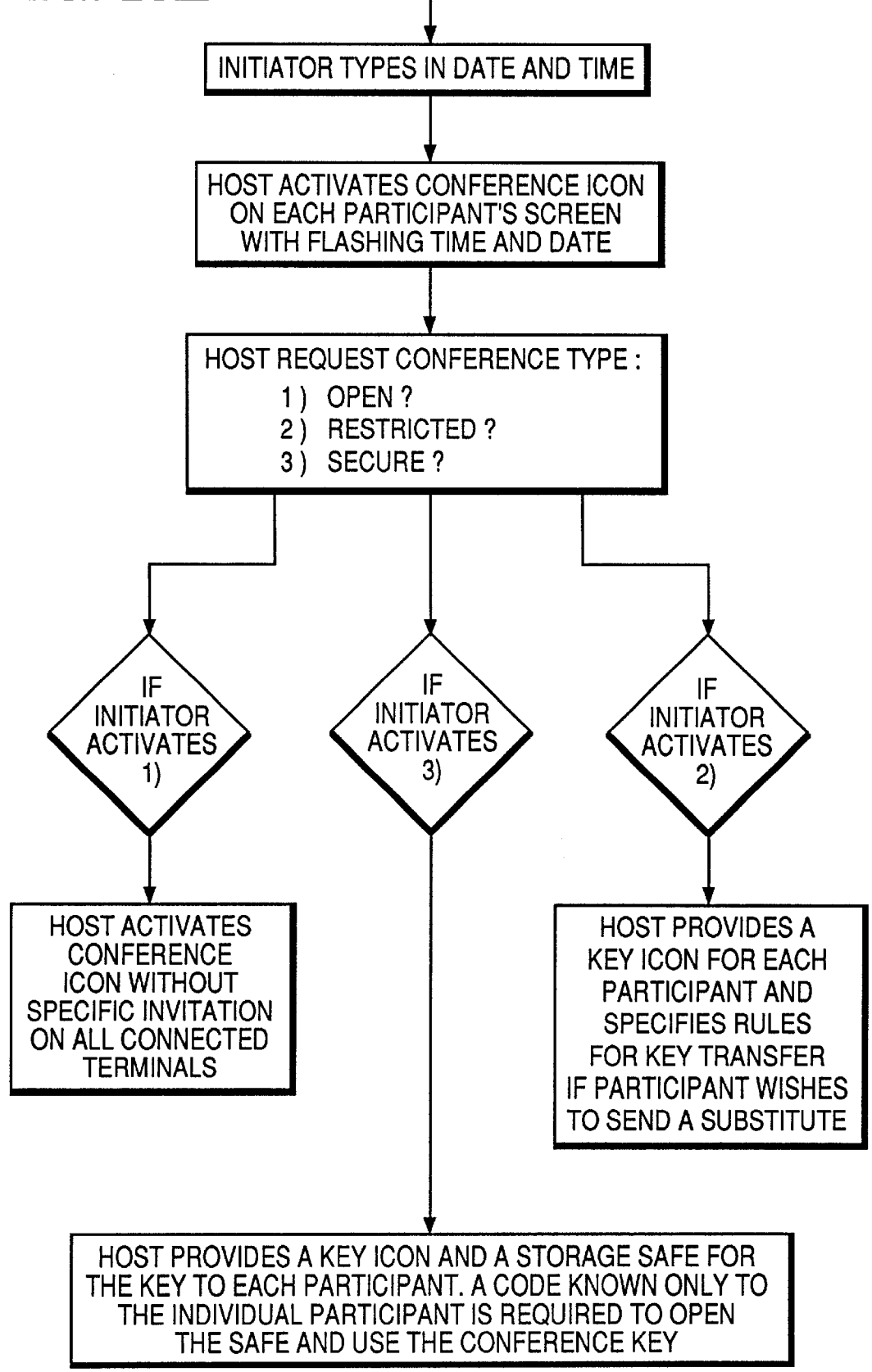
Figure 16A:
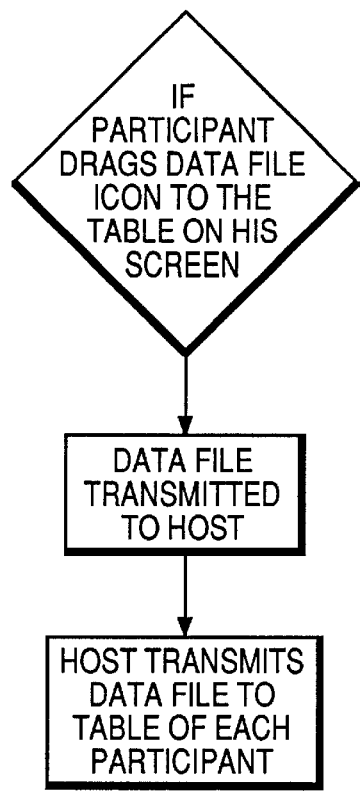
Figure 16B:
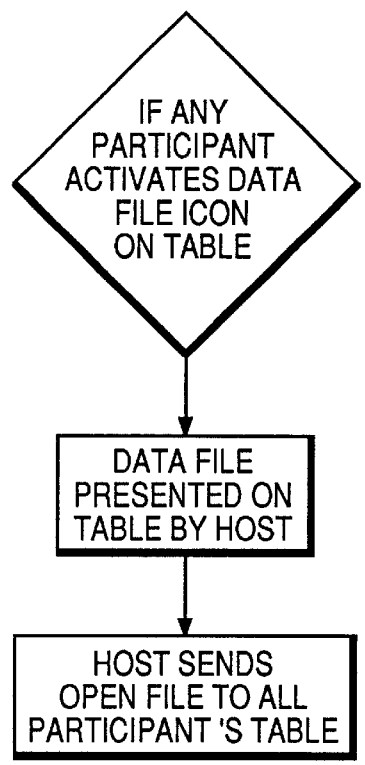
Figure 16C:
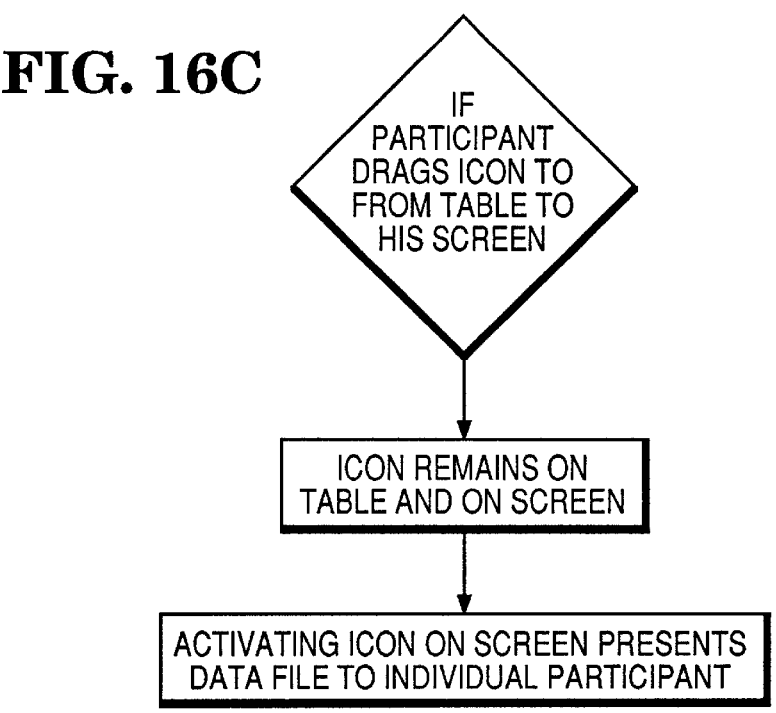
Figure 17A:
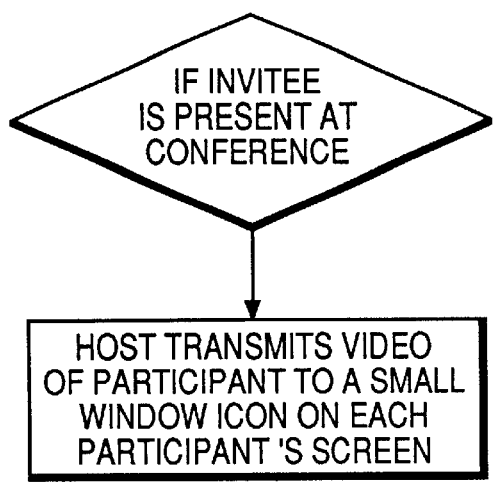
Figure 17B:
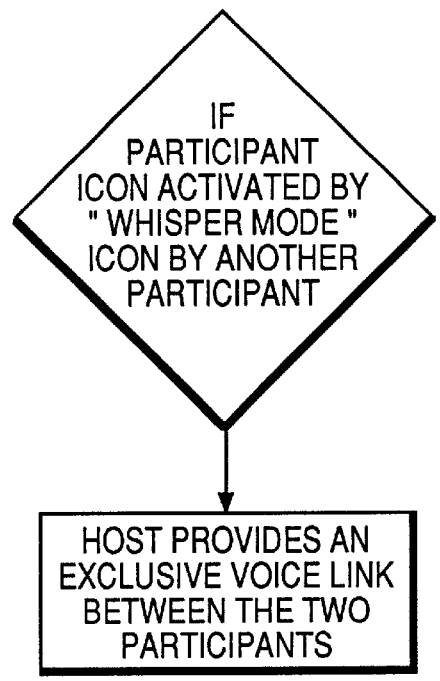
Figure 17C:
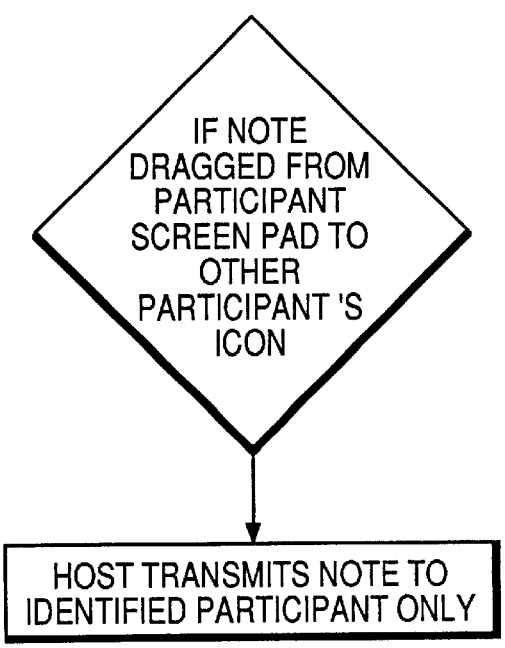
Figure 18:
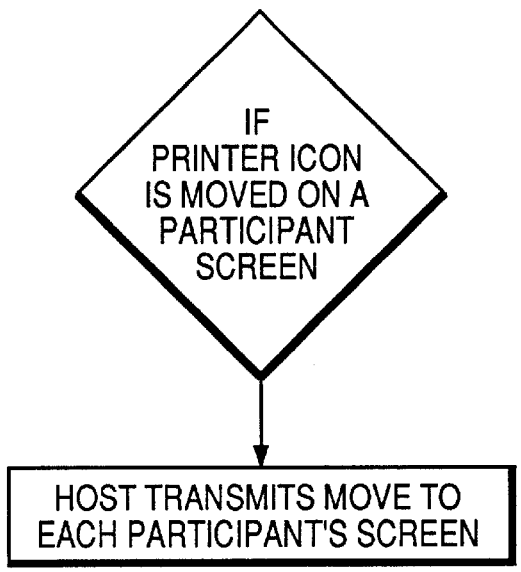
Figure 19:
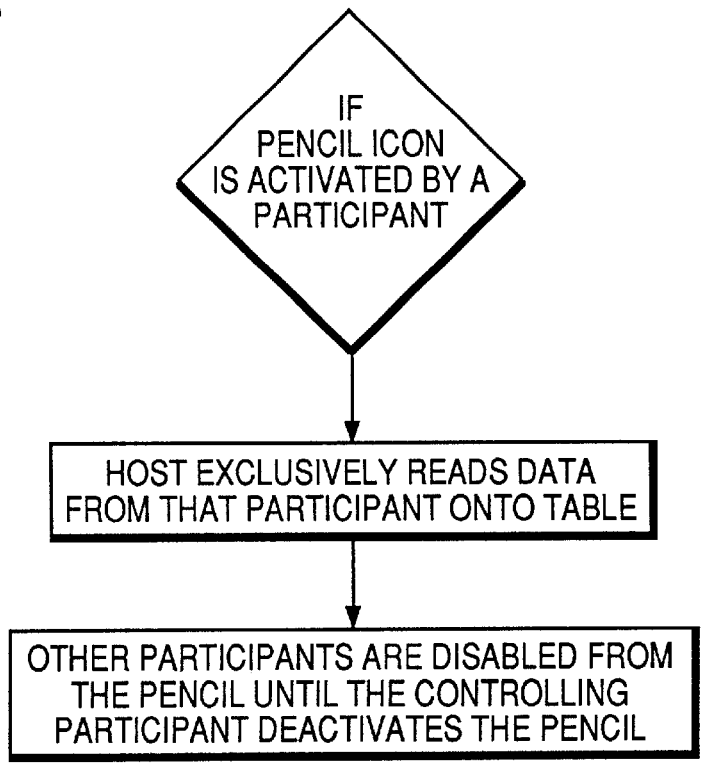
Figure 20A:
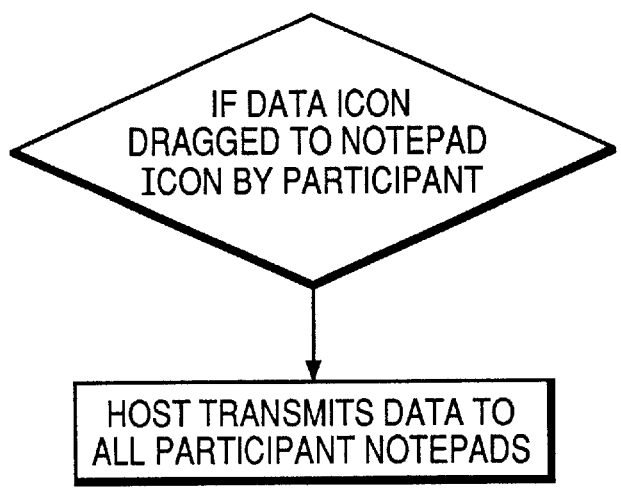
Figure 20B:
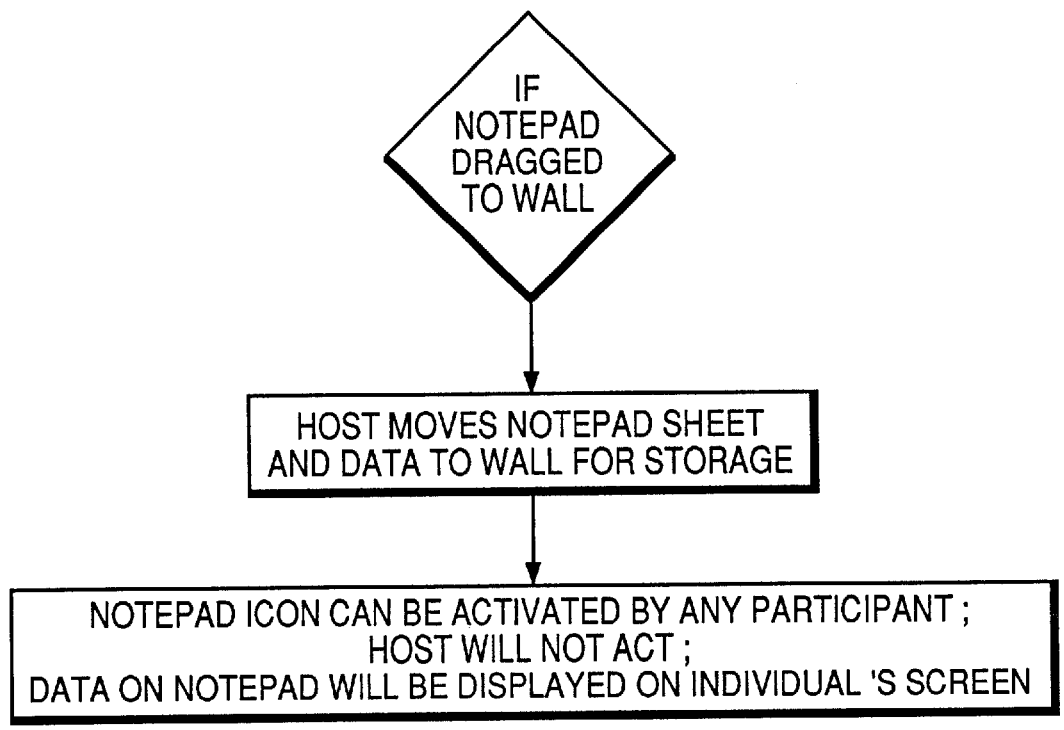
Figure 21A:
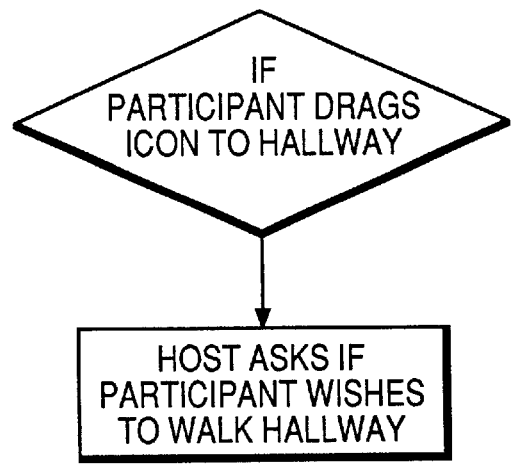
Figure 21B:
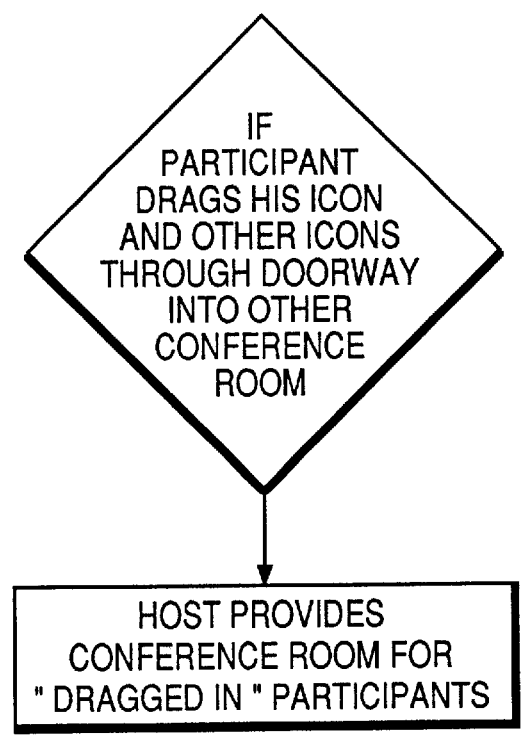
Figure 22A:
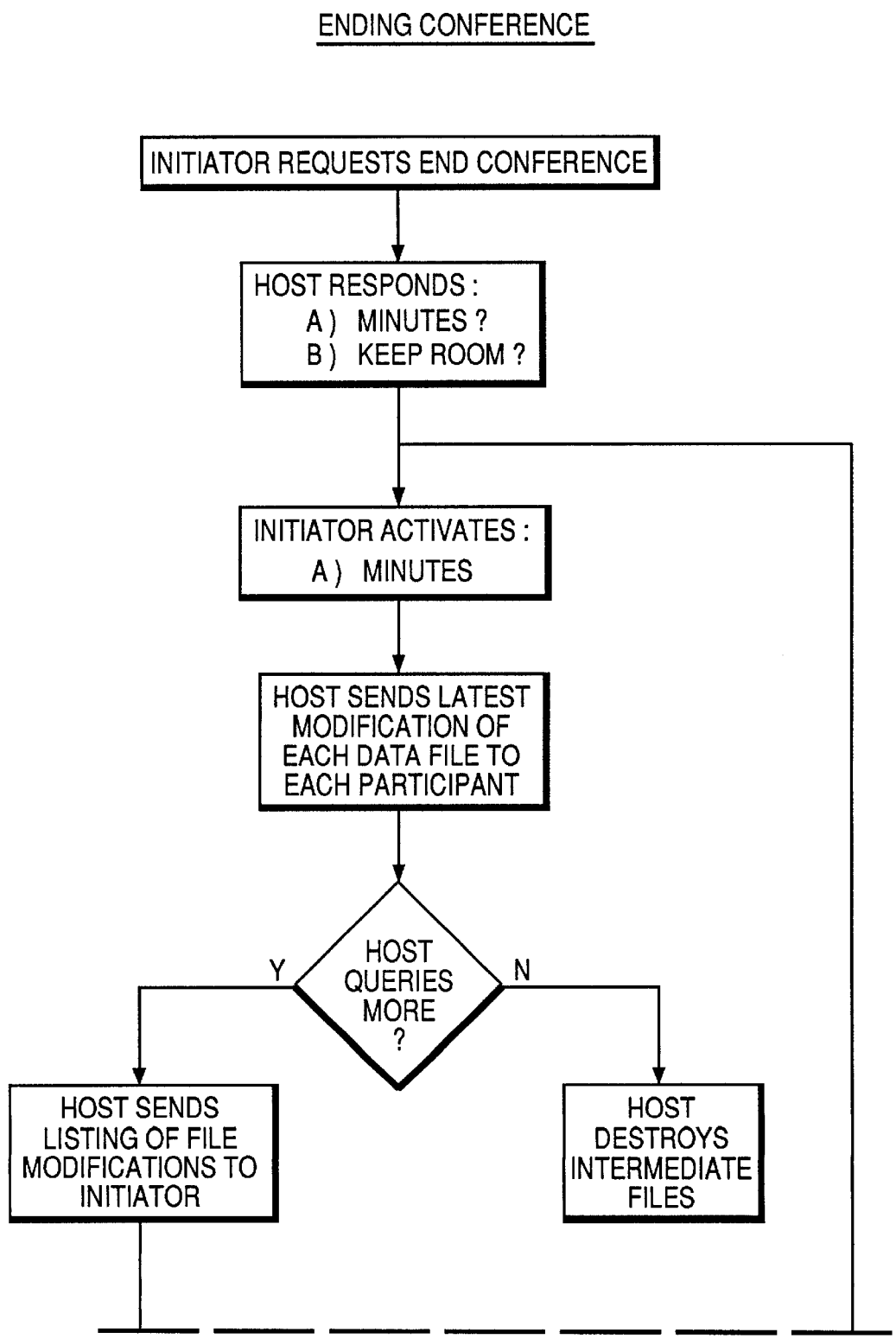
Figure 22B:
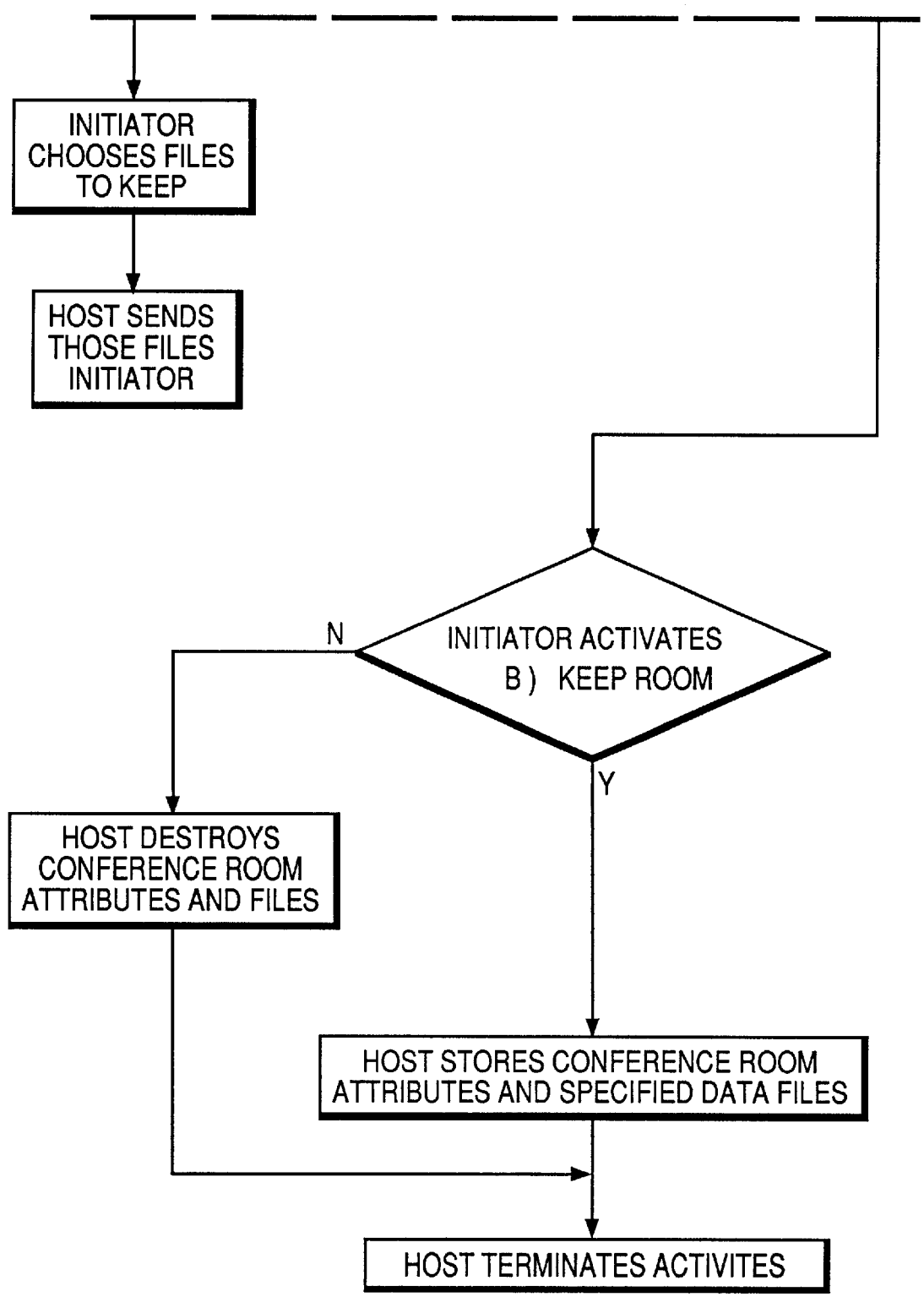

Pseudo-code usable for programming the host and the local computers is contained in the Appendix, and is considered self-explanatory. This Pseudo-code is presented in flow-chart format in FIG. 15, et seq.

Numerous substitutions and modifications can be undertaken without departing from the true spirit and scope of the invention. What is desired to be secured by Letters Patent is the Invention as defined in the following claims.

Appendix

OBJECT ORIENTED PSEUDO CODE
INITIATE CONFERENCE
ACTIVATE CONFERENCE REQUEST ICON
  HOST RESPONDS WITH:
  A) HOW MANY PARTICIPANTS?
  B) PARTICIPANT LOCATION?
  C) PARTICIPANT IDENTIFICATION?
  D) TIME AND DATE OF CONFERENCE?
INITIATOR ACTIVATES A) AND PROVIDES A NUMBER LESS THAN OR EQUAL TO THE SYSTEM MAXIMUM
INITIATOR ACTIVATES B) HOST PROVIDES LARGE AREA MAP
  INITIATOR ACTIVATES ZONES ON LARGE AREA MAP (1 . . . N)
  DO FOLLOWING SEQUENCE I=1,N
HOST PROVIDES ZONE=I PREVIOUSLY ACTIVATED ON LARGE AREA MAP
  INITIATOR ACTIVATES SPECIFIC SITES ON FIRST ZONE
  HOST STORES SPECIFIC SITE I.D. FOR SITES IN ZONE=I CONTINUE
  (HOST NOW HAS A LIST OF THE SPECIFIC SITES FOR INVITEES)
INITIATOR ACTIVATES C)
  HOST RESPONDS WITH:
    1) LIST AVAILABLE?
    2) PROVIDE SITE LISTINGS?
    3) WALK HALLS AT SITES?
IF INITIATOR ACTIVATES 1)
  THEN HOST REQUESTS LIST
    I) TYPE IN LIST?
    II) SCAN LIST?
  IF I) REQUESTER TYPES A LIST AND SENDS DOCUMENT TO HOST
  IF II) REQUESTER SCANS LIST WITH CAMERA AND SENDS DATA TO HOST
IF INITIATOR ACTIVATES 2)
  THEN FOR I=1,N
  HOST PROVIDES LIST FOR SITE I
    INITIATOR ACTIVATES PARTICIPANTS ON SITE I LIST CONTINUE
IF INITIATOR ACTIVATES 3)
  THEN FOR I=1,N
  HOST PROVIDES HALLWAY FOR SITE I
    INITIATOR SCROLLS UP AND DOWN HALLWAY
    INITIATOR ACTIVATES NAMEPLATE ON WALL
    HOST PROVIDES A DOORWAY EITHER OPEN, CLOSED OR PARTIALLY OPEN
    IF OPEN INITIATOR REQUESTS PARTICIPATION HOST STORES I.D.
IF CLOSED INITIATOR LEAVES MESSAGE WITH HOST TO REQUEST PARTICIPATION WHEN AVAILABLE
IF PARTIALLY OPEN INITIATOR PEEKS THROUGH DOORWAY
  HOST SIGNALS PARTICIPANT
  VOICE CONTACT ESTABLISHED
  PARTICIPANT I.D. ACTIVATED BY INITIATOR IF PARTICIPANT WILL ATTEND CONFERENCE CONTINUE
(NOW THE LIST OF INVITEES EAS BEEN IDENTIFIED) INITIATOR ACTIVATES D)
  HOST REQUESTS TIME AND DATE
  INITIATOR TYPES IN TIME AND DATE
HOST ACTIVATES CONFERENCE ICON ON EACH PARTICIPANT'S SCREEN WITH FLASHING TIME AND DATE
HOST REQUESTS CONFERENCE TYPE:
  1) OPEN?
  2) RESTRICTED?
  3) SECURE?
IF INITIATOR ACTIVATES 1)
  HOST ACTIVATES CONFERENCE ICON WITHOUT SPECIFIC INVITATION ON ALL CONNECTED TERMINALS
IF INITIATOR ACTIVATES 2)
  THEN HOST PROVIDES A KEY ICON FOR EACH PARTICIPANT AND SPECIFIES RULES FOR KEY TRANSFER IF PARTICIPANT WISHES TO SEND A SUBSTITUTE
IF INITIATOR ACTIVATES 3)
  THEN HOST PROVIDES A KEY ICON AND A STORAGE SAFE FOR THE KEY TO EACH PARTICIPANT
  A CODE KNOWN ONLY TO THE INDIVIDUAL PARTICIPANT IS REQUIRED TO OPEN THE SAFE AND USE THE CONFERENCE KEY
CONFERENCE ROOM
HOST CREATES A CONFERENCE ROOM WITH THE FOLLOWING ATTRIBUTES
  —CONFERENCE TABLE
  ICON FOR EACH PARTICIPANT
  POINTER FOR EACH PARTICIPANT
  "PENCIL" ICON FOR WRITING
  NOTEPAD
  CONFERENCE ROOM WALLS
  CONFERENCE ROOM DOORS
DESCRIPTION OF ATTRIBUTES
  CONFERENCE TABLE—THE CONFERENCE TABLE IS A "WINDOW" SIZED TO PARTIALLY FILL A SCREEN; IT RESIDES ON THE HOST AND IS TRANSPORTED TO EACH PARTICIPANT ACTIVITIES:
IF PARTICIPANT DRAGS ICON TO THE TABLE ON HIS SCREEN
  ICON (DATA FILE) TRANSMITTED TO HOST
  HOST TRANSMITS ICON (DATA FILE) TO TABLE OF EACH PARTICIPANT
IF ANY PARTICIPANT ACTIVATES ICON ON TABLE
  DATA FILE PRESENTED ON TABLE BY HOST
  HOST SENDS OPEN FILE TO ALL PARTICIPANTS TABLES
IF PARTICIPANT DRAGS ICON FROM TABLE TO HIS SCREEN
  ICON REMAINS ON TABLE AND ON SCREEN
  ACTIVATING ICON ON SCREEN PRESENTS DATA FILE TO INDIVIDUAL PARTICIPANT

ICON FOR PARTICIPANT—IF
INVITEE PRESENT AT CONFERENCE
THEN HOST TRANSMITS VIDEO OF PARTICIPANT TO A SMALL WINDOW ICON ON EACH PARTICIPANTS SCREEN
IF PARTICIPANT ICON ACTIVATED BY "WHISPER MODE" ICON BY ANOTHER PARTICIPANT
  HOST PROVIDES AN EXCLUSIVE VOICE LINK BETWEEN THE TWO PARTICIPANTS
IF NOTE DRAGGED FROM PARTICIPANT SCREEN PAD TO OTHER PARTICIPANT ICON
  HOST TRANSMITS NOTE TO IDENTIFIED PARTICIPANT ONLY POINTER FOR PARTICIPANT—
EACH PARTICIPANT HAS A POINTER ON THE CONFERENCE TABLE HE CAN DIRECTLY MANIPULATE
IF POINTER ICON MOVED ON A PARTICIPANT SCREEN
  HOST TRANSMITS MOVE TO EACH PARTICIPANT
PENCIL ICON FOR WRITING—
IF PENCIL ICON ACTIVATED BY A PARTICIPANT
  HOST EXCLUSIVELY READS DATA FROM THAT PARTICIPANT ONTO TABLE
  OTHER PARTICIPANTS ARE DISABLED FROM THE PENCIL UNTIL THE CONTROLLING PARTICIPANT DEACTIVATES THE PENCIL
NOTEPAD ICON—
IF DATA ICON DRAGGED TO NOTEPAD ICON BY PARTICIPANT HOST TRANSFERS DATA TO ALL PARTICIPANT NOTEPADS
IF NOTEPAD DRAGGED TO WALL
  HOST MOVES NOTEPAD SHEET AND DATA TO WALL FOR STORAGE
NOTEPAD ICON CAN BE ACTIVATED BY ANY PARTICIPANT
  HOST WILL NOT ACT; DATA ON NOTEPAD WILL BE DISPLAYED ON INDIVIDUAL'S SCREEN
CONFERENCE ROOM WALLS—
NOTEPAD SCREENS CAN BE DRAGGED TO WALL FOR STORAGE
MURALS OR PICTURES CAN BE PLACED ON WALLS
SPECIFIC WALL CONFIGURATION AND WALL UTILITY WILL BE PRAGMATICALLY DETERMINED BY THE SIZE OF PARTICIPANTS SCREENS
CONFERENCE ROOM DOORS—
CONFERENCE ROOM WILL HAVE DOOR TO HALLWAY
  IF PARTICIPANT DRAGS ICON TO HALLWAY
  HOST ASKS IF PARTICIPANT WISHES TO WALK HALLWAY
  CAN GO INTO PREVIOUSLY DESCRIBED LOOP TO FIND ADDITIONAL PARTICIPANTS IF INITIATOR'S RULES ALLOW IT
IF PARTICIPANT DRAGS HIS ICON AND OTHER ICONS THROUGH DOORWAY INTO OTHER CONFERENCE ROOM
HOST PROVIDES CONFERENCE ROOM FOR "DRAGGED IN" PARTICIPANTS
  CONFERENCE ROOM HAS ALL ATTRIBUTES OF MAIN CONFERENCE EXCEPT—
HOST REQUIRES ACCESS TO PARENT CONFERENCE ROOM
  INITIATOR OF CHILD CONFERENCE ROOM MAY SET RULES FOR PARTICIPATION AS WAS DONE FOR PARENT CONFERENCE
MEETING MINUTES
ALL DATA FILES BROUGHT TO THE CONFERENCE TABLE AND ALL MODIFICATIONS OF THE DATA FILES WILL BE STORED BY THE HOST FOR THE DURATION OF THE CONFERENCE
  IF RULES ALLOW
    LAST MODIFICATION FOR EACH DATA FILE BROUGHT TO CONFERENCE WILL BE SENT TO EACH PARTICIPANT IN A CONFERENCE FILE
INITIATOR MAY REQUEST ADDITIONAL FILES FROM HOST BY QUERY
ENDING CONFERENCE
INITIATOR REQUESTS END CONFERENCE
HOST RESPONDS
  A) MINUTES?
  B) KEEP ROOM?
INITIATOR ACTIVATES A)
HOST SENDS LATEST MODIFICATION OF EACH DATA FILE TO EACH PARTICIPANT
  HOST QUERIES MORE?
    YES ACTIVATED BY INITIATOR
      HOST SENDS LISTING OF FILE MODIFICATIONS TO INITIATOR
        INITIATOR CHOOSES FILES TO KEEP
HOST SENDS THOSE FILES TO INITIATOR
INITIATOR ACTIVATES NO
  HOST DESTROYS INTERMEDIATE FILES
  HOST ACTIVATES B)
  INITIATOR ACTIVATES YES
    HOST STORES CONFERENCE ROOM ATTRIBUTES AND SPECIFIED
DATA
FILES
HOST TERMINATES ACTIVITIES
INITIATOR ACTIVATES NO
  HOST DESTROYS CONFERENCE ROOM ATTRIBUTES AND FILES
HOST TERMINATES ACTIVITIES

What is claimed is:

1. A computer system, comprising:

a) a plurality of local computers, each associated with a video camera, a keyboard, and a pointing device, and each computer capable of receiving
  i) video input from its video camera,
  ii) keyboard input from its keyboard, and
  iii) pointer input from its pointer;

b) a single host computer for
  i) receiving said inputs from the local computers;
  ii) generating a common visual image, based on said inputs; and
  iii) distributing the common image to the local computers.

2. System according to claim 1, wherein no other computer performs the functions recited in paragraphs (b) (ii) and (b) (iii).

3. System according to claim 1, wherein
i) the common visual image comprises an image initially captured by a video camera of a first local computer and
ii) the common visual image comprises graphical features later generated by a pointing device of a second local computer.

4. System according to claim 1, and further comprising d) means for
   i) accepting speech from a conference participant and
   ii) transmitting said speech to another conference participant, to the exclusion of other participants.

5. System according to claim 1, and further comprising d) means for
   i) accepting visual material from a conference participant and
   ii) transmitting said visual material to another conference participant, to the exclusion of other participants.

6. System according to claim 1, wherein
   A) some of the local computers are located in offices and
   B) at least one of said offices is equipped with a second video camera, in addition to the camera associated with the local computer located within that office, which
      1) surveys the office from a point near a door of the office, and
      2) transmits a video image to said host computer.

7. A remote conferencing system, comprising:
   a) at each of several locations, equipment which includes the following:
      i) a computer having a display and a pointing device,
      ii) a video camera, and
      iii) a telephone equipped with a speaker;
   b) a host computer means for
      i) receiving input from each of the pointing devices;
      ii) providing a common image for each of the displays, on which a respective pointer appears which is controlled by each pointing device;
      iii) linking all of the telephones into a common conference; and
      iv) providing a plurality of images to all displays, each image based on input from a respective video camera.

8. A host computer for a remote conferencing system, comprising:
   a) program means for:
      i) establishing a link among two or more remote computers which allows the following types of data to be collected by the host from the remote computers and distributed to the remote computers:
         A) video data from video cameras located at the remote computers,
         B) audio data, and
         C) digital data;
      ii) based on said collected data,
         A) generating an image and
         B) transmitting the image to the remote computers; and
      iii) modifying the image in response to signals received from the remote computers.

\* \* \* \* \*